(12) United States Patent
Inoue et al.

(10) Patent No.: US 7,177,841 B2
(45) Date of Patent: Feb. 13, 2007

(54) DIGITAL CONTENTS DISTRIBUTION SYSTEM, DIGITAL CONTENTS DISTRIBUTION METHOD, ROAMING SERVER, INFORMATION PROCESSOR, AND INFORMATION PROCESSING METHOD

(75) Inventors: Hiroshi Inoue, Yokohama (JP); Yoshikazu Yokomizo, Yokohama (JP); Tsutomu Ando, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 09/761,719

(22) Filed: Jan. 18, 2001

(65) Prior Publication Data

US 2002/0035723 A1 Mar. 21, 2002

(30) Foreign Application Priority Data

Jan. 28, 2000 (JP) ............................. 2000-020041

(51) Int. Cl.
G06Q 99/00 (2006.01)
(52) U.S. Cl. ........................................ 705/51; 713/165
(58) Field of Classification Search ............ 705/50–59, 705/64–67, 74–75, 26–27, 44; 713/163–170, 713/200–202; 380/201–203; 709/200–203
See application file for complete search history.

(56) References Cited

U.S. PATENT DOCUMENTS

| | | | |
|---|---|---|---|
| 5,239,648 A | | 8/1993 | Nukui |
| 5,504,816 A | | 4/1996 | Hamilton et al. |
| 5,675,782 A | * | 10/1997 | Montague et al. ............ 726/4 |
| 5,778,365 A | * | 7/1998 | Nishiyama ...................... 707/9 |
| 5,892,900 A | * | 4/1999 | Ginter et al. ............... 713/200 |
| 6,704,797 B1 | * | 3/2004 | Fields et al. ................ 709/246 |
| 6,725,372 B1 | * | 4/2004 | Lewis et al. ................ 713/176 |

FOREIGN PATENT DOCUMENTS

| | | |
|---|---|---|
| EP | 0 447 039 A2 | 3/1992 |
| EP | 0 666 694 A1 | 8/1995 |
| EP | 0 969 668 A2 | 1/2000 |
| EP | 1113617 A2 * | 7/2001 |
| WO | WO 99/45456 | 9/1999 |
| WO | WO 99/48296 | 9/1999 |
| WO | WO 9963420 A1 * | 12/1999 |
| WO | WO 00/04717 | 1/2000 |

OTHER PUBLICATIONS

Reichman et al., "Intellectual Property Rights in Data?", Vanderbilt Law Review, v50n1, pp. 49-166, Jan. 1997, ISSN: 0042-2533.*
"Opima Specification Version 1.0" Opima—Open Platform Initiative for Multimedia Access, Oct. 13, 1999.
"MPEG-4 Systems, Concepts and Implementation", Franco Casalino, et al., Lecture notes in Computer Science, Springer Verlag, NY, pp. 504-517, May 26, 1998.
"Functional Model of a Conditional Access System", EBU Review—Technical, European Broadcasting Union, Brussels, BE, No. 266, pp. 67-77, Dec. 21, 1995.

* cited by examiner

Primary Examiner—Mary D. Cheung
(74) Attorney, Agent, or Firm—Fitzpatrick, Cella, Harper & Scinto

(57) ABSTRACT

A digital contents distribution system including a client, a digital contents server, a roaming server, and a network connected between these terminals. The roaming server includes a receiving section for receiving from the digital contents server a digital content with an intellectual property right protection system protecting the digital content, and a section for converting the intellectual property right protection system of the received digital content into another kind of intellectual property right protection system, and a section for delivering the converted system to the client.

33 Claims, 24 Drawing Sheets

DIGITAL CONTENTS DISTRIBUTION SYSTEM, DIGITAL CONTENTS DISTRIBUTION METHOD, ROAMING SERVER, INFORMATION PROCESSOR, AND INFORMATION PROCESSING METHOD

BACKGROUND OF THE INVENTION

1. Field of the Invention

The present invention relates to a digital contents distribution system, a digital contents distribution method, a roaming server, an information processor, and an information processing method, and more particularly, to a digital contents roaming service using an intellectual property right protection system.

2. Related Background Art

FIG. 1 is a diagram showing a conventional digital video data transmitting and receiving system.

Referring to FIG. 1, a digital video data distribution server 10 is provided with a digital video data storage device 12, such as a hard disk, in which a digital video data is recorded in advance. The digital video data distribution server 10 downloads digital video data from the storage device 12 to a receiving client 20 through a network, e.g., the Internet according to a request from the receiving client 20. The distribution server 10 has a conversion section 11 for encoding digital video data. The distribution server 10 encodes digital video data in the conversion section 11 to reduce the amount of data, and delivers the encoded data to the receiving client 20 through the procedure in accordance with the Transmission Control Protocol/Internet Protocol (TCP/IP) or the like.

The receiving client 20 has a conversion section 21 for decoding digital video data. The receiving client 20 reproduces a digital video signal from received data in the conversion section 21, and records the reproduced signal in a digital video data storage device 22 or displays a reproduced video on a display device (not shown).

One moving picture scene is formed so as to be constituted by a plurality of objects. Each object is compressed by being encoded in the conversion section 11 of the distribution server 10. The encoded objects are decoded and reconstructed at the receiving client 20 to reproduce the moving picture scene. This reproduction system is, for example, an MPEG-4 (Moving Pictures Experts Group Phase-4) player.

FIG. 2 shows the configuration of a conventional MPEG-4 player.

FIG. 2 is formed on the basis of "ISO/IEC SC29 14496-1 FIG. 1-1", details of which are described in "ISO/IEC SC29 14496-1". This system will be only outlined with reference to FIG. 2.

An MPEG-4 bit stream transmitted over a network or the like or an MPEG-4 bit stream read out from a recording medium (storage medium) such as a digital versatile disk read-only memory (DVD-ROM) is received at a "TransMux Layer" through a procedure corresponding to transmission/read (establishment of session) and is separated, decoded and reproduced as streams of scene description data, object data, and object description data in "FlexMux" sections. Scene reproduction or graphical processing of the data is performed on the basis of scene description data.

Specifications relating to a case where authentication is required with respect to each of objects for the purpose of copyright protection are omitted in FIG. 2.

FIG. 3 is a schematic diagram formed by simplifying FIG. 2. If there is a need for authentication with respect to each of objects for the purpose of copyright protection or the like, an "IP Data Set" (intellectual property right (e.g., copyright) information group) may be included in a bit stream containing scene description data and a plurality of object data groups.

However, even if an "IP Data Set" (intellectual property right information group) is included in a transmitted bit stream, and even if the "IP Data Set" is reproduced in "object Descriptors" in the system shown in FIG. 2 or 3, no processing is performed with respect to the "IP Data Set" at the time of video reproduction processing, so that "IP Protection" (intellectual property right protection) processing is not executed.

It is, of course, possible for a certain application on the reproducing side to receive the decoded "IP Data Set" and to execute "IP Protection" processing. However, this processing is specific to this application, and the same processing is not always performed in other players or other models.

Also, in the system shown in FIG. 2 or 3, a video is reproduced after the completion of authentication with respect to each of the objects. In a case where new objects appear successively during reproduction of a moving picture scene, there is a need to temporarily stop the reproduction to perform authentication each time a new object appears.

FIG. 4 shows the configuration of an MPEG-4 player formed by adding an intellectual property right (e.g., copyright) protection system (IPMP System) and an object data processing flow control section (IPMP Stream Flow Control) to the system shown in FIGS. 2 and 3.

An MPEG-4 bit stream containing video object coded data requiring intellectual property right protection is divided into individual object data groups at Demux Layer 21 and the divided object data groups are converted and synchronized with respect to player internal time according to Sync Layer 22 coding and time stamp information added at the time of forming of the bit stream.

On the other hand, IPMP System 26 performs authentication processing on the basis of copyright protection information separated at Demux Layer 21 with respect to each separated object data group requiring intellectual property right protection, and delivers a permission signal to IPMP Stream Flow Control 23 to enable object data processing flow control. The data is decoded at Compression Layer 24 by a decoder corresponding to each object, scene composition is performed at Composition Layer 25 according to the decoded scene description, and the result of scene composition is displayed.

There are several possible methods for the object data processing flow control in particular. Problems to be solved will be described by referring to Test Conditions #1 and #2 by way of example.

Table 1 shows four test plans as an example of means for explaining the relationship between an IPMP System (IPMPS) and Stream Flow Control.

TABLE 1

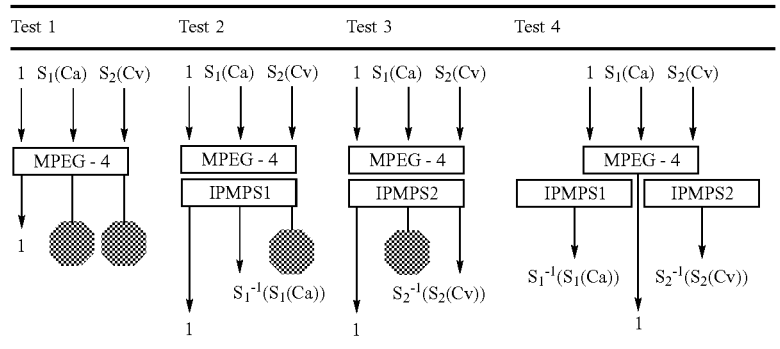

● Graceful Error

In Table 1, an Unprotected Text Object Stream is expressed as "t", a Protected Audio Stream is expressed as "$S_1(Ca)$", and a Protected Video Stream is expressed as "$S_2(Cv)$".
Also, an IPMP System for $S_1(Ca)$ is expressed as "IPMPS1", and the result of XOR between original coded data and the code "x" in ASCII is set as "$S_1(Ca)$". Accordingly, a decipherment "key" is the code "x" in ASCII and decipherment is performed through an XOR operation with the "key".
Also, an IPMP System for $S_2(Cv)$ is expressed as "IPMPS2", and the result of XOR between original coded data and the code "a" in ASCII is set as "$S_1(Cv)$".

In Table 1, an Unprotected Text Object Stream is expressed as "t", a Protected Audio Stream is expresses as "$S_1(Ca)$", and a Protected Video Stream is expressed as "$S_2(Cv)$".

Also, an IPMP System for $S_1(Ca)$ is expressed as "IPMPS1", and the result of XOR between original coded data and the code "x" in ASCII is set as "$S_1(Ca)$". Accordingly, a decipherment "key" is the code "x" in ASCII and decipherment is performed through an XOR operation with the "key".

Also, an IPMP System for $S_2(Cv)$ is expresses as "IPMPS2", and the result of XOR between original coded data and the code "a" in ASCII is set as "$S_2(Cv)$". Accordingly, a decipherment "key" is the code "a" in ASCII and decipherment is performed through an XOR operation with the "key".

"Graceful Error" is an error caused in downstream of the decoder due to failure in normal decipherment of the protected object stream with the "key" and is not namely a "fatal error". For example, possible "Graceful Errors" in the case of the protected video object stream are as expressed by "not displayed", "a disturbed picture is displayed", etc.

Table 2 shows conditions and parameters in IPMP Verification Tests.

| IPMP Verification Test Condition and Parameters | | | | |
|---|---|---|---|---|
| Condition | Test 1 | Test 2 | Test 3 | Test 4 |
| Contents | | | | |
| Ct | Unprotected Text | ← | ← | ← |
| S1 (Ca) | Protected Audio | ← | ← | ← |
| S2 (Cv) | Protected Video | ← | ← | ← |
| IPMP Condition | | | | |
| IPMP-ES and IPMP-D | yes | yes | yes | yes |
| IP Identification Data Set | yes | yes | yes | yes |
| IPMP-S1 | none | XOR 'x' for S1 (Ca) | none | XOR 'x' for S1 (Ca) |
| IPMP-S2 | none | none | XOR 'a' for S2 (Cv) | XOR 'a' for S2 (Cv) |
| Test Condition | | | | |
| #1 | none | Embedded 'key' & constant delay | ← | ← |
| #2 | none | User interaction & non-fixed delay | ← | ← |
| Synchronization | yes | yes | yes | yes |
| Expected result | Ct; pass | Ct; pass | Ct; pass | Ct; pass |
| | S1 (Ca); error | S1 (Ca); pass | S1 (Ca); error | S1 (Ca); pass |
| | S2 (Cv); error | S2 (Cv); error | S2 (Cv); pass | S2 (Cv); pass |

Referring to Table 2, when Test 2 is executed under Test Condition #1, the proper "key" for each of the object streams exists in the IPMP System (IPMPS1, IPMPS2) to immediately "decipher" each incoming object stream, and the deciphered object stream is output to each decoder.

When Test 2 is executed under Test Condition #2, no proper "key" for each of object streams exists in the IPMP System (IPMPS1, IPMPS2), the proper "key" is input by a user interactive method, such as by external key-inputting or by inserting a smart card to "decipher" each incoming object stream, and the deciphered object stream is output to the decoder.

FIG. 5 is a diagram showing internal functional blocks and data flows in an example of an MPEG-4 System Player. FIG. 5 is drawn as a simplified diagram for explanation of a sync mechanism, in which an illustration of an IPMP System and object data processing flow control is omitted.

First, an entry function, Execute( ) of the MPEG-4 System Player initiated by an application invokes each of functional modules, secures data area buffers, and performs memory allocation for each of functions in functional entities, etc., thus making preparations for data processing.

An input MPEG-4 bit stream is received by FlexDemux 31 which is a Service module function in the DMIF layer. Packet data or a data file from a network is received as a sequence of data groups to be delivered to an ALManager 32 functional block.

In ALManager 32, data groups are separated with respect to kinds of object, e.g., video data, audio data, and scene description data to form streams in data channels. Scene description data and data in information relating to objects are delivered to BIFSDecoder 33 while video data and audio data are delivered to Decoder 34.

In Presenter 35 and a Media Stream data processing section (not shown), adjustment of the time relationship among decoded Media Object data groups (Video, Audio data), synchronization between the data groups and scene composition are performed on the basis of scene description information decoded by BIFSDecoder 33 and Decoder 34 and time stamp information added at the time of forming of the bit stream.

FIG. 6 outlines the above-described sequence of data processing.

Referring to FIG. 6, FlexDemux 31 receives an MPEG-4 bit stream and separates it into elementary streams (ES) with respect to each kind of object data. ALManager 32 then divides the ES of each kind of object data on a decoding unit basis, and BIFSDecoder 33 and Decoder 34 perform decoding processing of each kind of object. A decoded data group Media Stream of each kind of object data is thereby formed. Presenter 35 performs time adjustment of each object data group by using a "MediaStreamImp::Fetch()" function for processing of Media Stream Data, combines each of the object data groups into one scene, and displays the scene.

FIG. 7 is a diagram showing an example of data processing for time adjustment. Time adjustment processing in Presenter 35 will be described in detail with reference to FIG. 7.

First, in step S71, a tolerance value is added to the current time of the System Player (→dwCurrentTime). In step S72, data to be processed (AU: Access Unit) is obtained. In step S73, time stamp information (TimeStamp) on the data to be processed (AU) is converted into a System Player time (→dwTime). In step S74, the current time (dwCurrentTime) and the time stamp (dwTime) of the data to be processed (AU) are compared.

If the time stamp (dwTime) of the data to be processed (AU) is after the current time (dwCurrentTime), the process advances to step S76 and actual scene composition is performed. If the time stamp (dwTime) of the data to be processed (AU) is before the current time (dwCurrentTime), it is determined that the data is inappropriate to scene composition (the data cannot be used at a scene composition time). Then the process moves to step S75 and the next data block to be processed (AU) is set as a processing object.

FIG. 8 is a time-line chart of the time adjustment processing shown in FIG. 7.

Referring to FIG. 8, an Object stream ($AU_0$) arrives at BIFSDecoder 33 or Decoding Buffer 81 of Decoder 34 at a time Arrival($AU_0$), is then decoded, and is sent to Composition Memory 82 of Presenter 35 at a time corresponding to a time stamp DTS($AU_0$) added at the time of encoding, to be used in scene composition from a scene composition time CTS($CU_0$).

Similarly, the following object stream ($AU_1$) is transferred from Decoding Buffer 81 to Composition Memory 82 at a time DTS($AU_1$) to be used in scene composition from CTS($CU_1$).

It can be understood from FIG. 8 that if DTS in Decoding buffer 81 is after the actual current time dwCurrentTime as shown in FIG. 7, it is adjusted to the actual scene composition time CTS in Composition memory 82.

FIG. 9 shows a process formed by adding processing in an IPMP System to the process shown in FIG. 6. Details of this process are as described below.

The same steps as those in FIG. 6 are first performed. That is, FlexDenux 31 receives an MPEG-4 bit stream and separates it into elementary streams (ES) with respect to the kinds of object data, and ALManager 32 divides the ES of each kind of object data on a decoding unit basis.

Next, from the object data divided by ALManager 32, a protected stream is identified on the basis of information relating particularly to IPMP, and IPMP System processing, such as inputting of the proper "key" and authentication, is performed. BIFSDecoder 33 and Decoder 34 then decode Media Streams which are data groups to be decoded with respect to the kinds of object data, and Presenter 35 performs time adjustment of each object and composes and displays scenes one by one.

An example of object data processing flow control will now be described with respect to a case where Test 2 shown in Table 2 is executed under Test Condition #1 and a case where Test 2 is executed under Test Condition #2.

First, in the method using Test Condition #1, the "key"-decipherment time is transmitted as a certain delay in each IPMP System to the decoder. In this case, therefore, no synchronization problem occurs if the supposed total delay is set within a range such as to be absorbed in Composition Layer 24 shown in FIG. 4 or Presenter 35 shown in FIG. 5.

On the other hand, processing in the case of the method using Test Condition #2 is as described below.

FIG. 10 is a flowchart for explaining processing in an IPMP System in a case where Test 2 is executed under Test Condition #2.

First, in step S101, a stream of each object divided on the decoding unit basis is obtained by ALManager 32. In step S102, a determination is made as to whether or not the proper "key" has been input. If it is determined that the proper "key" has not been input, the process advances to step S103 and the protected stream is held without being deciphered. If the proper "key" has been input, the process moves to step S104 and the protected stream is deciphered and the next processing is started.

In the case where Test 2 is executed under Test Condition #2, and where the flow control shown in FIG. 10 is performed, processing of a steam requiring inputting of the proper "key" is suspended. On the other hand, a non-protected stream or a stream already deciphered after authentication on inputting of the proper "key" successively undergoes time synchronization processing for decoding and scene composition. The lapse of time including the time period for authentication and decipherment of the suspended stream on inputting of the proper "key" before a start of the next processing is not a fixed time period, because different user interactive operations are performed with respect to each of the protected streams. It is also possible that the dwTime is past the dwCurrent Time when the processing is restarted.

In such a case, as is apparent from FIGS. 7 and 8, the stream on which processing is restarted is not decoded until a dwTime after the dwCurrentTime appears after the restarting. The stream portion before the next data to be processed (AU) is skipped (that is, the data is thinned out), and the skipped portion is not used in scene composition.

IPMP information for MPEG-4 objects is to have an IPMP Message structure based on using the IPMP_Descriptor for identifying an IPMP stream with respect to each of objects which is described in ISO/IEC SC29 IS14496-1(System) 8.3.2.5 IPMP message syntax and semantics specified by the International Organization for Standardization, and which is shown in FIG. 11.

ISO/IEC SC29 IS14496-1(System) 8.3.2.5 IPMP message syntax and semantics reads as follows.

```
8.3.2.5 IPMP message syntax and semantics
    8.3.2.5.1 Syntax
        class IPMP_Message( )extends ExpandableBaseClass
        {
            bit(16) IPMPS_Type;
            if (IMPMS_Type == 0){
            bit(8) URLString[sizeOfClass-2];
            }else{
            bit(8) IPMP data[sizeOfClass-2];
            }
        }
    8.3.2.5.2 Semantics
```

The IPMP_Message conveys control information for an IPMP System.

IPMPS_Type-the type of the IPMP System. A zero value does not correspond to an IPMP System, but indicates the presence of a URL. A Registration Authority as designated by the ISO shall assign valid values for this field.

URLString[ ]-contains a UTF-8[3]encoded URL that shall point to the location of a remote IPMP_Message whose IPMP_data shall be used in place of locally provided data.

IPMP_data-opaque data to control the IPMP System.

The important point here is that when an IPMP System in conformity with the ISO standard is used, it is registered by a Registration Authority and a unique ID is provided from the Registration Authority.

A standard specification has been planned such that the zeroth value of an ID number designates an IPMP System at an external URL destination, 1 to 2000h (in hexadecimal) are a reserve for ISO, 2001h to ffffh are numbers for ID assigned by a Registration Authority.

FIG. 12 shows a case (Case 1) where a client user A obtains and reproduces an MPEG-4 content or object having IPMP information corresponding to IPMPS_Type 2001h from a server B.

If the user's reproducing device has already been provided with IPMPS_Type 2001h, user authentication such as that described above is performed and decryption using the user's key information, etc., are performed to normally reproduce the content.

On the other hand, in a case where, as shown in FIG. 13 (Case 2), user A tries to further obtain and reproduce an MPEG-4 content or object having IPMP information corresponding to IPMPS_Type 2021h from a server C, it is necessary for the user to obtain an IPMP System in accordance with IPMPS_Type 2021h to enable reproduction. In this case, there are three considerations as described below.

1. The existing user A's device (a device compatible with IPMPS_Type 2001h) may be incapable of obtaining an IPMP System of a different IPMS_Type. There is a need for a common platform compatible with each IPMP System.
2. If one MPEG-4 content has a multi-object configuration with IPMP System information corresponding to different IPMPS_Types, reproduction of the content requires IPMP Systems necessary to different objects, and it is possible that physical requirements in terms of the memory capacity, the processing speed, etc., of the device are not satisfied. The user must know whether the device can operate a plurality of different IPMP Systems.
3. User authentication is required with respect to each of different IPMP Systems. Therefore, a problem relating to synchronization between objects for real-time processing or the like may arise in some case. This problem is indeterminable because of its dependency on the object configurations of contents and on authentication methods.

A specification of a common platform called OPIMA and an application interface (API) has been proposed on consortium level by supposing a case shown in FIG. 13 (case 2) and considering the problem 1 in particular.

Even if the OPIMA kernel are implemented in different devices or application systems, the problems 2 and 3 remain unsolved. In practice, it is difficult for a device which has a restricted component mount space, and whose memory capacity, battery capacity and CPU power are therefore limited, e.g., a portable telephone, to simultaneously have a plurality of different IPMP Systems and to perform processing using the IPMP Systems.

On the other hand, standardization by unifying all IPMP Systems into one entails a drawback in that if a security system such as IPMP is made ineffective by an illegal act, such as hacking, content (or object) right holders sustain great damage. The process of setting a new standard IPMP System and putting products in conformity with the new standard into the market is assumed to require a longer time in comparison with a similar process on company or business world level, because the process includes specifying a universal standard, a country representative voting procedure, or the like.

SUMMARY OF THE INVENTION

In view of the above-described circumstances, an object of the present invention is to provide a digital contents distribution system, a digital contents distribution method, a roaming server, an information processor, and an information processing method which enable reproduction of a content while protecting the intellectual property right of the right holder of the content without having users receiving the content perform a complicated procedure even if various kinds of intellectual property right (e.g., copyright) protection systems exist, and which ensure interoperability of intellectual property right systems on the content supply side with users.

To achieve the above-described object, according to one aspect of the present invention, there is provided a digital contents distribution system having a client, a digital contents server, a roaming server, and a network connected between the client, the digital contents server, and the roaming server, characterized in that the roaming server comprises means for receiving from the digital contents server a digital content with an intellectual property right protection system protecting the digital content, and means for converting the intellectual property right protection system of the received digital content into another kind of intellectual property right protection system, and for delivering the converted system to the client.

According to another aspect of the present invention, there is provided a digital contents distribution system having a client, a roaming server, and a network connected between the client and the roaming server, characterized in that the roaming server comprises means for receiving from the client a digital content with an intellectual property right protection system protecting the digital content, and means for converting the intellectual property right protection system of the received digital content into another kind of intellectual property right protection system, and for delivering the converted system to the client.

According to still another aspect of the present invention, there is provided a roaming server connected to a client and to a digital contents server through a network, the roaming server characterized by receiving means for receiving from the digital contents server a digital content with an intellectual property right protection system protecting the digital content, conversion means for converting the intellectual property right protection system of the received digital content into another kind of intellectual property right protection system, and distribution means for delivering to the client the digital content converted by the conversion means.

According to yet another aspect of the present invention, there is provided a roaming server connected to a client through a network, the roaming server characterized by receiving means for receiving from the client a digital content with an intellectual property right protection system protecting the digital content, conversion means for converting the intellectual property right protection system of the received digital content into another kind of intellectual property right protection system, and distribution means for delivering to the client the digital content converted by the conversion means.

According to yet another aspect of the present invention, there is provided a digital contents distribution method in a system having a client, a digital contents server, a roaming server, and a network connected between the client, the digital contents server, and the roaming server, characterized in that the roaming server performs steps of receiving from the digital contents server a digital content with an intellectual property right protection system protecting the digital content, and converting the intellectual property right protection system of the received digital content into another kind of intellectual property right protection system, and delivering the converted system to the client.

According to still another aspect of the present invention, there is provided a digital contents distribution method in a system having a client, a roaming server, and a network connected between the client and the roaming server, characterized in that the roaming server performs the steps of receiving from the client a digital content with an intellectual property right protection system protecting the digital content, and converting the intellectual property right protection system of the received digital content into another kind of intellectual property right protection system, and delivering the converted system to the client.

According to a further aspect of the present invention, there is provided a digital contents distribution method for a roaming server connected to a client and to a digital contents server through a network, characterized by the steps of receiving from the digital contents server a digital content with an intellectual property right protection system protecting the digital content, converting the intellectual property right protection system of the received digital content into another kind of intellectual property right protection system, and delivering the converted digital content to the client.

According to still a further aspect of the present invention, there is provided a digital contents distribution method for a roaming server connected to a client through a network, characterized by the steps of receiving from the client a digital content with an intellectual property right protection system protecting the digital content, converting the intellectual property right protection system of the received digital content into another kind of intellectual property right protection system, and delivering the converted digital content to the client.

According to still a further aspect of the present invention, there is provided an information processing apparatus capable of being connected to an external device through a network, characterized by transmission means for transmitting information on an intellectual property right protection system available for the apparatus and identification information for identification of the apparatus to the external device over the network, and receiving means for receiving from the external device a digital content with the intellectual property right protection system protecting the digital content over the network.

According to still a further aspect of the present invention, there is provided an information processing method for an information processing apparatus capable of being connected to an external device through a network, characterized by comprising the steps of transmitting information on an intellectual property right protection system available for the apparatus and identification information for identification of the apparatus to the external device over the network, and receiving from the external device a digital content with the intellectual property right protection system protecting the digital content.

Other objects, features and advantages of the invention will become apparent from the following detailed description taken in conjunction with the accompanying drawings.

DETAILED DESCRIPTION OF THE PREFERRED EMBODIMENTS

Figure 14:
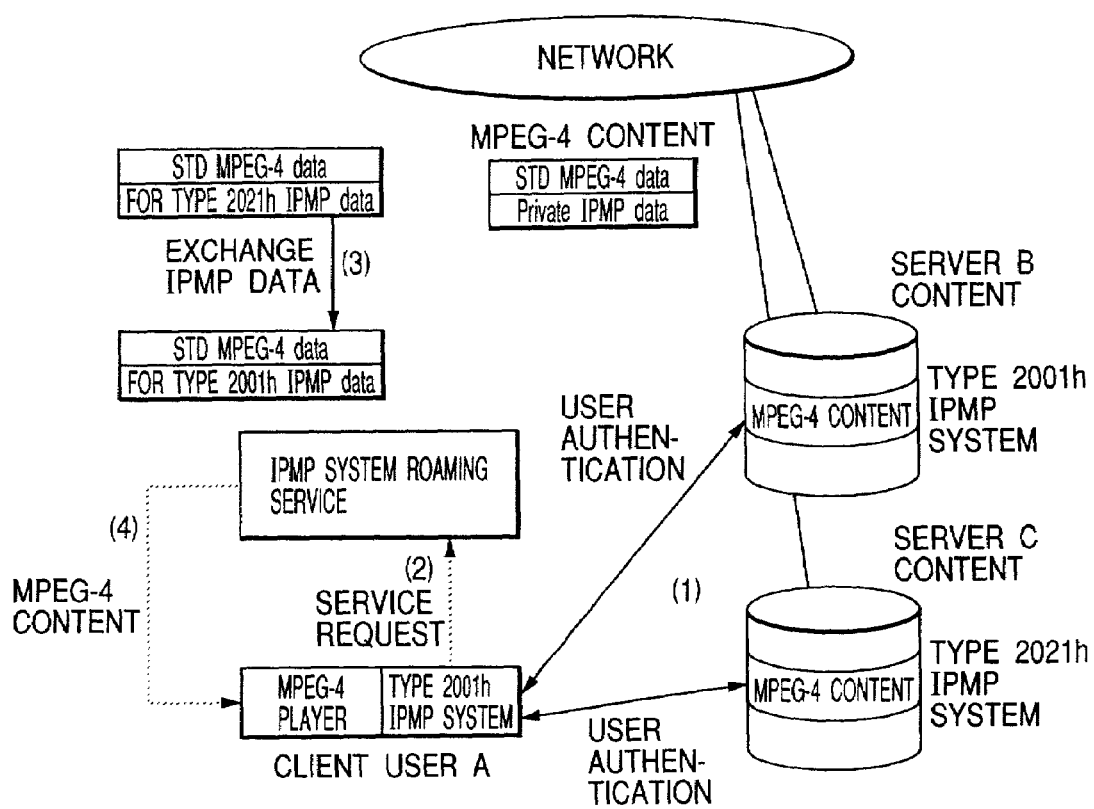
FIG. 14 is a diagram for explaining a system for roaming among IPMP Systems in Embodiment 1 of the present invention.

FIG. 14 is a diagram for explaining a system for roaming among IPMP Systems in Embodiment 1 of the present invention.

To obtain a content or object data, a user A requests each of contents/object data distribution servers to perform a regular procedure for user authentication or the like, thereby obtaining public key information, password parameters or the like, and data, and thereafter requests an IPMP System roaming service provider (hereinafter referred to as "roaming service provider") to perform conversion for obtaining IPMP System information necessary for user A to perform reproduction. The following are details of this process.

(1) User A (having a Type 2001h IPMP System) obtains a content or object data of a content from a server B (Type 2001h IPMP System) and from a server C (Type 2021h IPMP System), pays a necessary amount of money to these servers, performs a user authentication procedure, and receives IPMP System information, such as keys for decryption and password parameters.

(2) The user A's device does not have the necessary Type 2021h IPMP System for decryption and therefore cannot perform reproduction. User A then requests a roaming service provider to convert the IPMP System information.

(3) If the roaming service provider can convert the content or object IPMP System Type to the user A's IPMP System Type, it requests user A for a necessary amount of money for the conversion, and converts the IPMP System information into the form in conformity with Type 2001h on the condition agreed on by both the provider and user A.

(4) The roaming service provider returns the data with the converted IPMP System information to user A. (At this time, authentication is ordinarily performed to again confirm the user's identity.)

Figure 15:
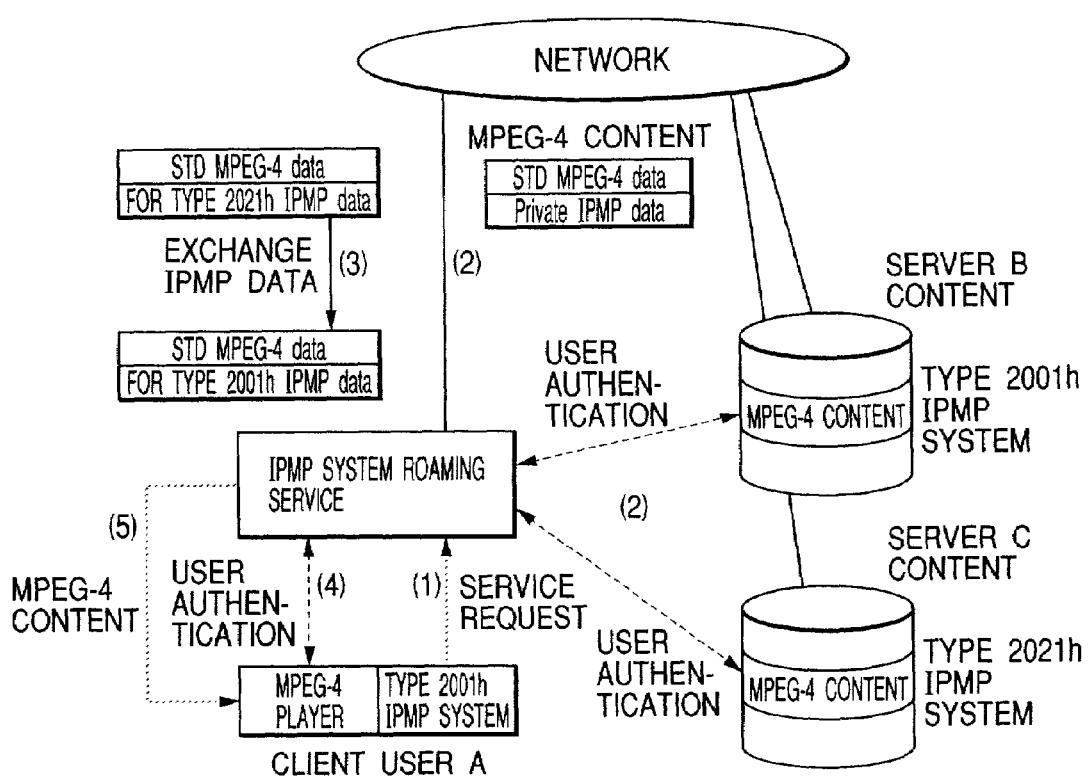
FIG. 15 is a diagram for explaining a system for roaming among IPMP Systems in Embodiment 2 of the present invention.

FIG. 15 is a diagram for explaining a system for roaming among IPMP Systems in Embodiment 2 of the present invention. In this embodiment, an example of a vicarious agency service for user authentication is also offered.

A user A gives an IPMP System roaming service provider (hereinafter referred to as "roaming service provider") a package order for collecting contents or objects which user A wants. The roaming service provider acts for the user to perform authentication and charging processing with each of the contents or objects distribution servers. The roaming service provider obtains data, keys, password parameters, or the like, converts this information into IPMP System information for user A, and provides user A with the necessary data and information. The following are details of this process.

(1) User A requests the roaming service provider to obtain the necessary contents or objects and to perform IPMP information conversion to the form in conformity with the Type 2001h IPMP System in user A's possession.

(2) The roaming service provider pays necessary amounts of money to server B (Type 2001h IPMP System) and to a server C (Type 2021h IPMP System) by a regular procedure, performs a user authentication procedure, obtains contents or object data, and receives keys for decryption, password parameters, and the like according to a request from user A.

(3) The roaming service provider performs IPMP information conversion to enable decryption necessary for reproduction with the user A's Type 2001h IPMP System.

(4) The roaming service provider confirms the user A's identity.

(5) The roaming service provider delivers the data with the converted IPMP information to user A.

Figure 16:
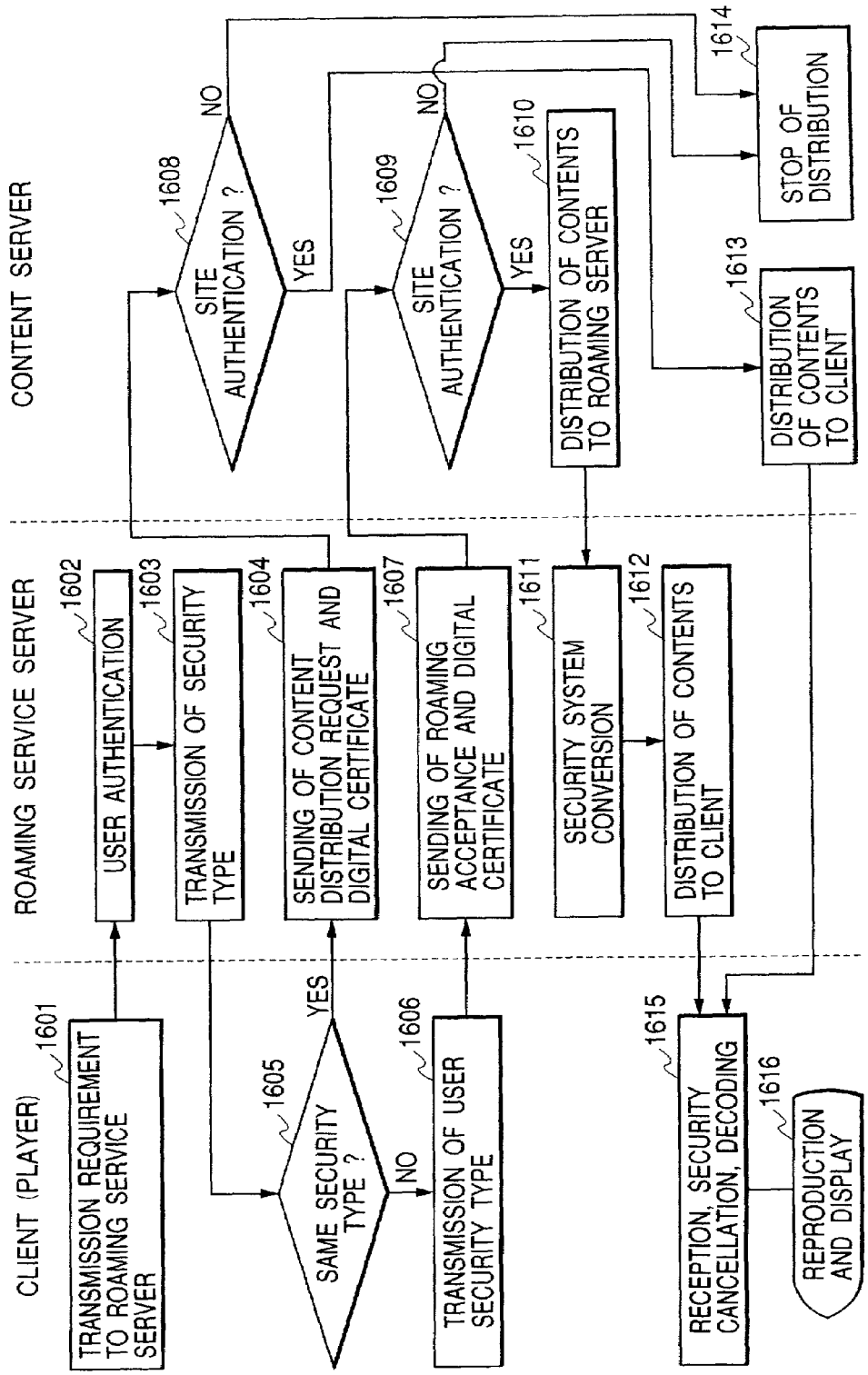
FIG. 16 is a diagram for explaining the process using the system shown in FIG. 15.

FIG. 16 is a diagram showing the process of data communication among a client (corresponding to user A shown in FIG. 15), a contents server (corresponding to server B or C shown in FIG. 15), and a roaming service server.

Referring to FIG. 16, the client first sends to the roaming service server a request for delivery of a content (step 1601).

The roaming service server then performs a user authentication operation (step 1602). The method for user authentication is not specified in this specification.

Next, the roaming service server transmits to the client a signal representing the type of security system (IPMP System Type) with which the content is protected (step 1603). It is assumed here that the security type has already been registered by the above-mentioned Registration Authority (RA).

Then, on the client side, a check is made as to whether the security system according to information from the contents server coincides with the security type of the client's player (whether the player can unlock the security system) (step 1605).

If it is determined in step 1605 that the security system types coincide with each other, the client sends a content distribution request to the roaming service server. At this request, the roaming service server sends a corresponding request to the contents server. Simultaneously, the roaming service server issues and transmits a digital certificate for verifying its authenticity (step 1604).

The contents server checks the authenticity of the roaming service server (step 1608) and deliver the content when it confirms that the roaming service is authentic (step 1613).

The client cancels the security, performs decoding of media data suitably compressed, or the like (step 1615), and reproduces and displays the data (step 1616).

On the other hand, if the security system types do not coincide with each other, the client transmits to the roaming service server the type of the security system that the client supports (step 1606).

The roaming service server then requests primary content distribution thereto to the contents server concerned (step 1607). The roaming service server sends a digital certificate, user authentication data, or the like, together with the request. At this request, the contents server checks the authenticity of the roaming service server (step 1609) and delivers the content to the roaming service server (step 1610).

The roaming service server receives the content, cancels the security by using security information supplied from the contents provider, and thereafter performs system conversion of the security system (step 1611).

For this conversion, a method may be used in which, with respect to a content protected by, for example, encryption, a cryptograph is deciphered by using information from the contents server, and is again encrypted by using a different cryptograph available for the client, or, after cryptograph decipherment, a digital watermark or the like is combined to indicate an intellectual property right (e.g., copyright). However, such processing will not be described in detail. After this processing, the roaming service server transmits the content to the client (step 1612).

On the client side, the content transmitted from the roaming service server and received is deciphered by using security cancellation information simultaneously transmitted from the roaming service server. Alternatively, if a digital watermark or the like has been added, it is removed. Ordinarily, a content such as a video is transmitted in a compressed state. Such a content is decoded from the compressed state as desired (step 1615). The received content is reproduced and displayed (step 1616).

Figure 17:
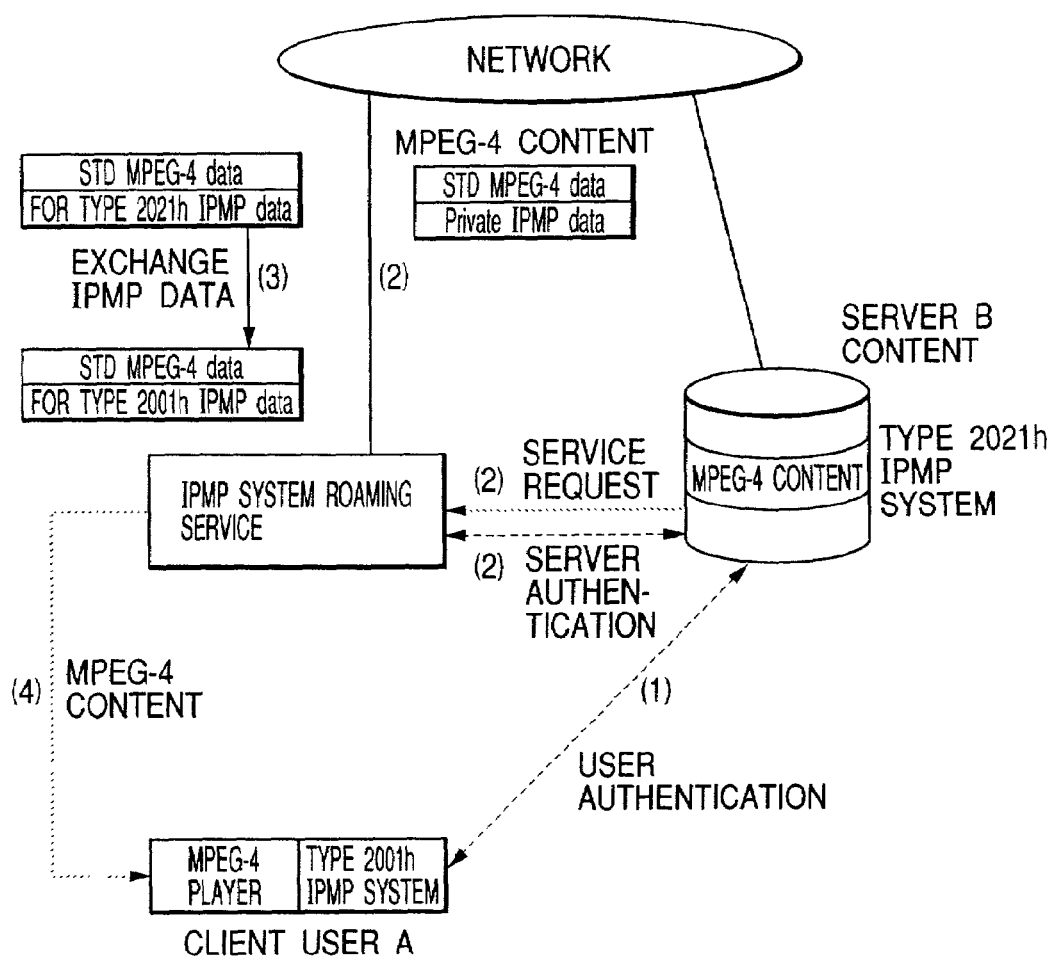
FIG. 17 is a diagram for explaining a system for roaming among IPMP Systems in Embodiment 3 of the present invention.

FIG. 17 is a diagram for explaining a system for roaming among IPMP Systems in Embodiment 3 of the present invention. In this embodiment, a contents provider makes a request for a roaming service.

(1) A user A requests delivery of a content or object from a server B by a regular procedure.
(2) Server B identifies the type of the IPMP System in possession of the user. If the type of the user's IPMP System differs from that of server B, server B requests an IPMP System roaming service provider (hereinafter referred to as "roaming service provider") to perform conversion of IPMP information by a regular procedure, and delivers the necessary data to the roaming service provider.
(3) By the server B's request for conversion, the roaming service provider performs IPMP information conversion such as to enable the user A's Type 2001h IPMP System to perform decryption necessary for reproduction.
(4) The roaming service provider delivers the data with converted IPMP information to user A.

Figure 18:
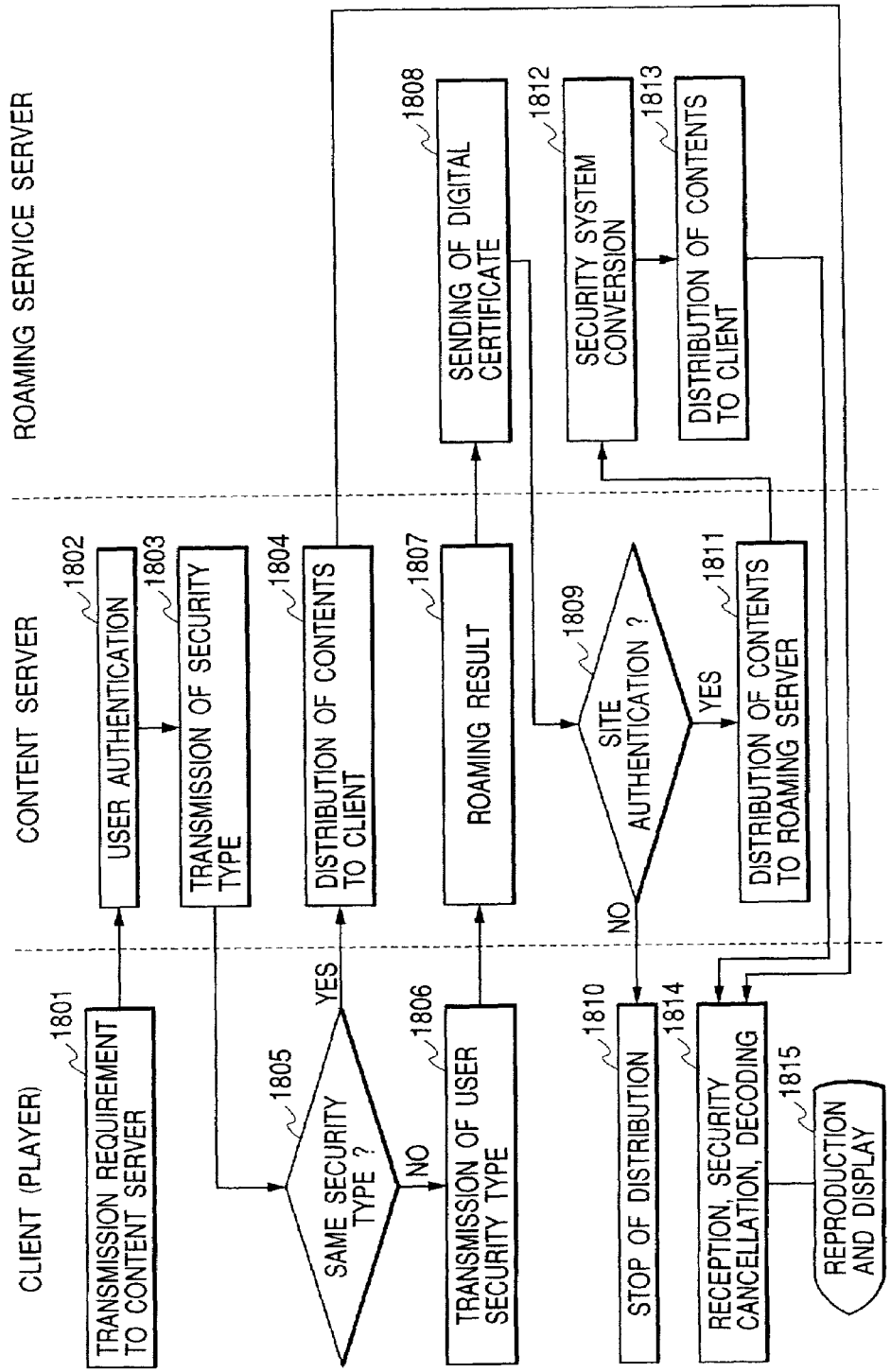
FIG. 18 is a diagram for explaining the process using the system shown in FIG. 17.

FIG. 18 is a diagram showing the process of data communication among a client (corresponding to user A shown in FIG. 17), a contents server (corresponding to server B shown in FIG. 17), and a roaming service server in FIG. 17.

While in the process shown in FIG. 16 a client transmits a request to a roaming service server, a client directly transmits a request to a contents server in this process.

First, the client first sends to the contents server a request for delivery of a content (step 1801).

The contents server then performs a user authentication operation (step 1802). The method for user authentication is not specified in this specification.

Next, the contents server transmits to the client a signal representing the type of security system (IPMP System Type) with which the content is protected (step 1803).

It is assumed here that the security type has already been registered by the above-mentioned RA. Then, on the client side, a check is made as to whether the security system according to information from the contents server coincides with the security type of the client's player (whether the player can unlock the security system) (step 1805).

If it is determined in step 1805 that the security system types coincide with each other, the contents server delivers the content (step 1804), and the client cancels the security, performs decoding of media data suitably compressed, or the like(step 1814), and reproduces and displays the data (step 1815).

On the other hand, if it is determined in step 1805 that the security system types do not coincide with each other, the client transmits to the contents server the type of the security system that the client supports (step 1806).

Next, the contents server requests a suitable roaming service server to perform a security conversion operation (step 1807).

The contents server and the roaming service server perform a communication for authenticity verification, which will be described with respect to a method using a digital certificate.

The roaming service server receiving the request transmits a digital certificate obtained in advance to the contents server to verify its authenticity (step 1808).

Receiving the digital certificate, the contents server checks the certificate to confirm the authenticity of the roaming service server (step 1809) and then transmits the content to the roaming service server (step 1811).

Next, the roaming service server performs system conversion of the security system (transconversion) (step 1812). More specifically, a method may be used in which, with respect to a content protected by, for example, encryption, a cryptograph is deciphered by using information from the contents server, and is again encrypted by using a different cryptograph available for the client, or after cryptograph decipherment, a digital watermark or the like is combined to indicate an intellectual property right (e.g., copyright). However, such processing will not be described in detail.

After this processing, the roaming service server transmits the content to the client (step 1813). On the client side, the content transmitted from the roaming service server and received is deciphered by using security cancellation information simultaneously transmitted from the roaming service server. Alternatively, if a digital watermark or the like has been added, it is removed. Ordinarily, a content such as a video is transmitted in a compressed state. Such a content is decoded from the compressed state (step 1814) as desired. The received content is reproduced and displayed (step 1815).

Figure 19:
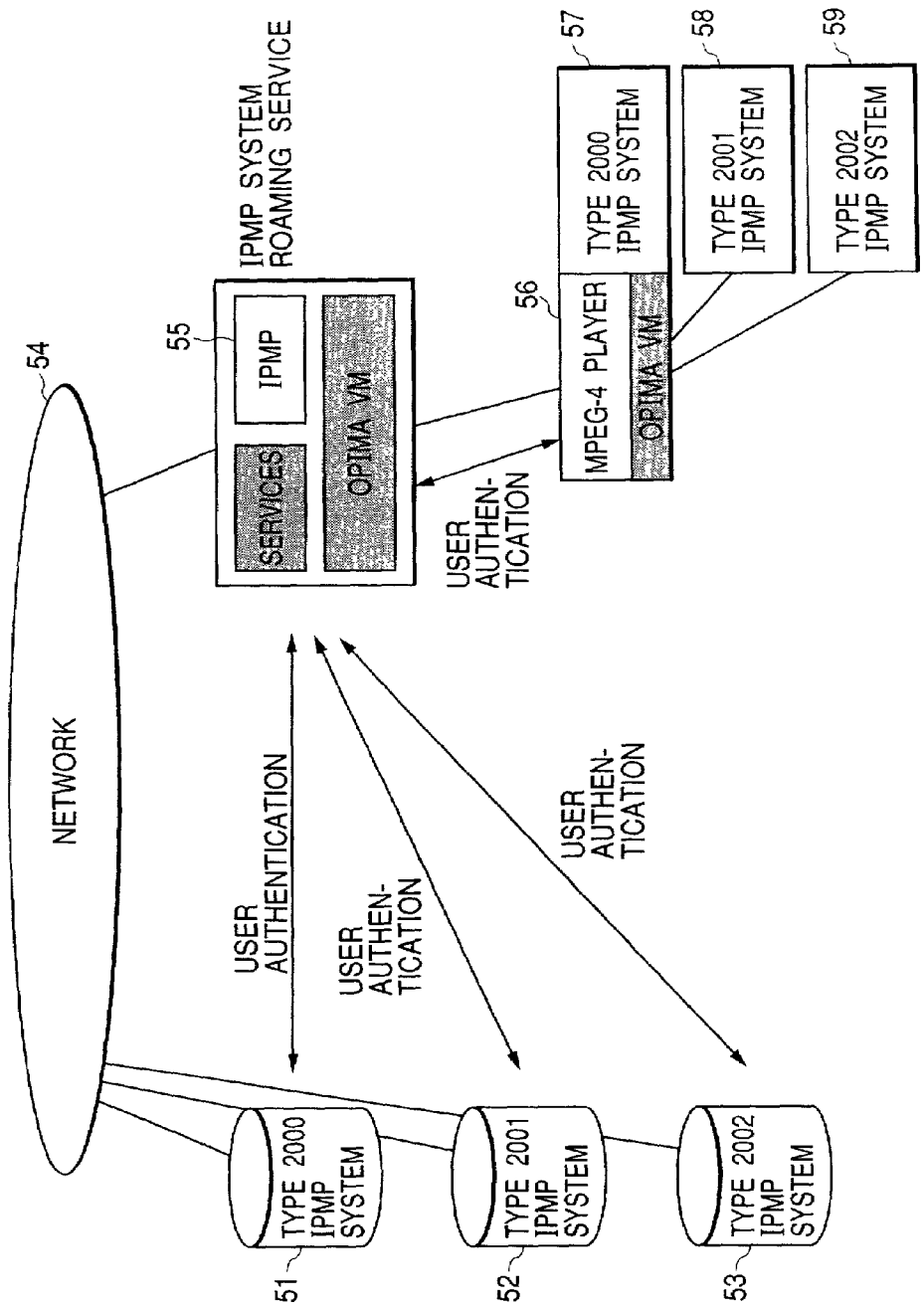
FIG. 19 is a diagram for explaining a system for roaming among IPMP Systems in Embodiment 4 of the present invention.

FIG. 19 is a diagram for explaining a system for roaming among IPMP Systems in Embodiment 4 of the present invention. This embodiment is an example of application of a system using the OPIMA VM described above with respect to the conventional art between a user A and a roaming service provider.

In this embodiment, the problems (the above-described problems 2 and 3) arising between different IPMP Systems in the OPIMA VM are solved and the system of the invention can be effectively used for automatization of exchange of other different kinds of information.

Referring to FIG. 19, there are provided an MPEG-4 contents server 51 of IPMPS-Type 2000, an MPEG-4 contents server 52 of IPMPS-Type 2001, and an MPEG-4 contents server 53 of IPMPS-Type 2002. These servers are connected to a network 54, to which are also connected an IPMP System roaming service server (hereinafter referred to as "roaming service server"), and an MPEG-4 player 56.

Each of the MPEG-4 player 56 and the roaming server 55 supports the protocol of the OPIMA model.

When the MPEG-4 player 56 requests delivery of a content from the roaming service server 55, the roaming service server 55 requests the contents server 51, 52, or 53 holding the contents to download the content.

It is assumed here that the content exists in the server 52.

In this case, user authentication is performed between the roaming service server 55 and the player 56. It may also be performed simultaneously between the contents server 53 and the roaming service server 55.

Then, the content is downloaded from the server 52 to the roaming service server 55 over the network 54. This downloading may be performed by the same procedure as one of those explained above in the description of the embodiments or may be performed by the procedure in accordance with the OPIMA system. In this embodiment, downloading is performed by one of the procedures other than that of the OPIMA system.

On the other hand, the OPIMA system is used between the roaming service server 55 and the player 56. If the MPEG-4 player 56 has been provided with only the Type 2000 IPMP System, it requests the roaming service server 55 to download the Type 2001 IPMP System. Since the roaming service server 55 has the IPMP Systems for almost all the contents servers, it may directly download the desired IPMP system to terminal 56. That is, the roaming service server 55 downloads the Type 2001 IPMP System.

After the completion of the download of the Type 2001 IPMP System, the player 56 can change the IPMP system from Type 2000 to Type 2001 and perform end-to-end communication using the compatible S-Type.

According to Embodiment 4, data distribution can be performed without any considerable delay, thereby ensuring real-time performance.

An example of a specification of service requests realizing the service of the above-described embodiment will be described below.

Figure 20:
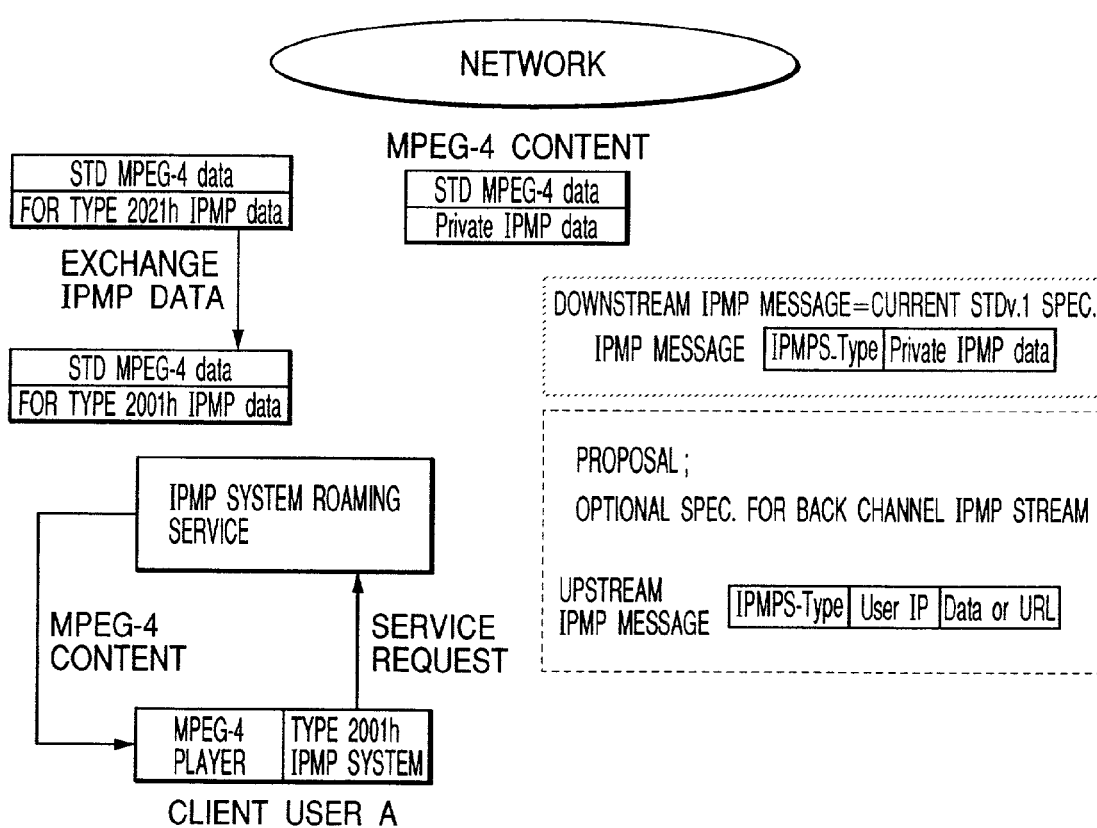
FIG. 20 is a diagram for explaining a concrete service request specification for realizing a roaming service of an embodiment of the present invention.

FIG. 20 shows common basic information when the service of this embodiment is executed by a request from a user or a contents provider requiring IPMP information exchange service.

Figure 12:
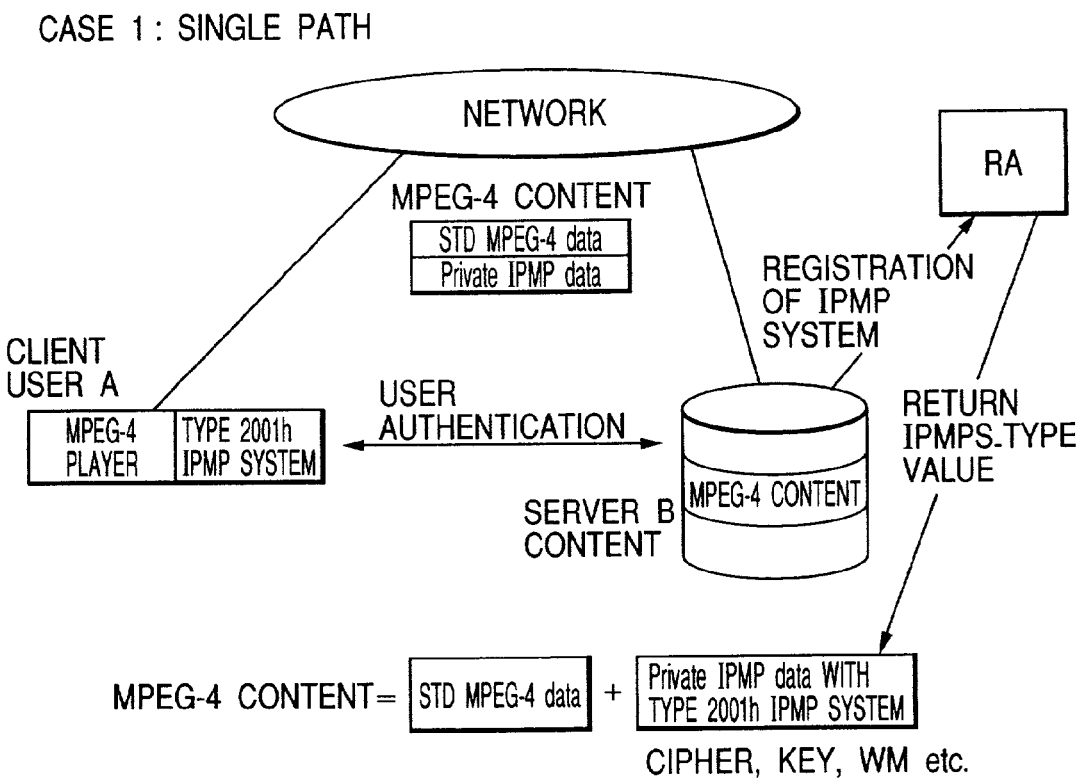
FIG. 12 is a diagram showing an example where a user obtains and reproduces an MPEG-4 content from an external server.
Figure 13:
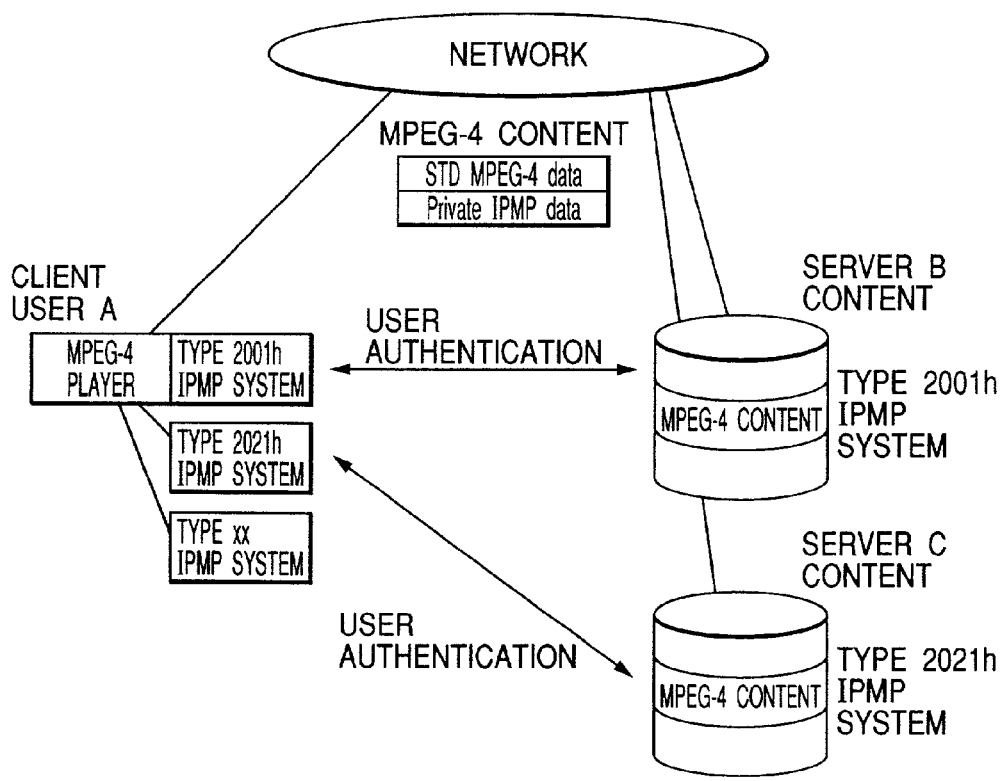
FIG. 13 is a diagram showing another case where a user obtains and reproduces an MPEG-4 content from an external server.

If a content or an object includes MPEG-4 IPMP information as shown in FIG. 12, the IPMP information has the "IPMP Message" data structure described in the international standard specification as shown in FIG. 20. This data contains, as its header, a unique IPMP System ID registered by a Registration Authority. From this ID, it is possible to identify the type of the IPMP System for security of the content or object data obtained by user A.

On the other hand, the roaming service provider is required at least:

1) to know the type of the IPMP System in possession of user A requesting conversion;
2) to identify the user A's reproducing device to enable delivery of data after conversion (by using, for example, Internet Protocol address (IP_address) or the like as information for identifying the user A's reproducing device); and
3) to have the data with which IPMP information conversion is requested, or information on a source from which the data can be obtained.

These requirements with respect to the roaming service are common to all cases regardless of the IPMP System Type, and all users and all roaming service providers are to have these sorts of information in common.

To enable a user to obtain the service even when changing the roaming service provider, the system may be arranged so that the proposed data structure shown in FIG. 20 can be exchanged via a back-channel. In this manner, it is possible to achieve a more smooth roaming service on a worldwide standard scale.

As a means for transmitting a roaming service request through the proposed (Roaming Service Syntax) data structure shown in FIG. 20, and as a method more highly standardized, a flag specification has been provided with respect to returning of a stream from a player for enabling upstream processing (a function using the back-channel function in MPEG-4 to deliver information from the player side to the server side) of roaming service request information supplied as Upchannel information shown in FIG. 20 from the player side where downstream processing (for receiving an MPEG-4 bit stream and performing scene reproduction) is performed during ordinary use. This embodiment will be explained with respect to an example of use of this function.

Implementation of the back-channel in accordance with the present invention will be described with reference to the drawings.

Figure 1:
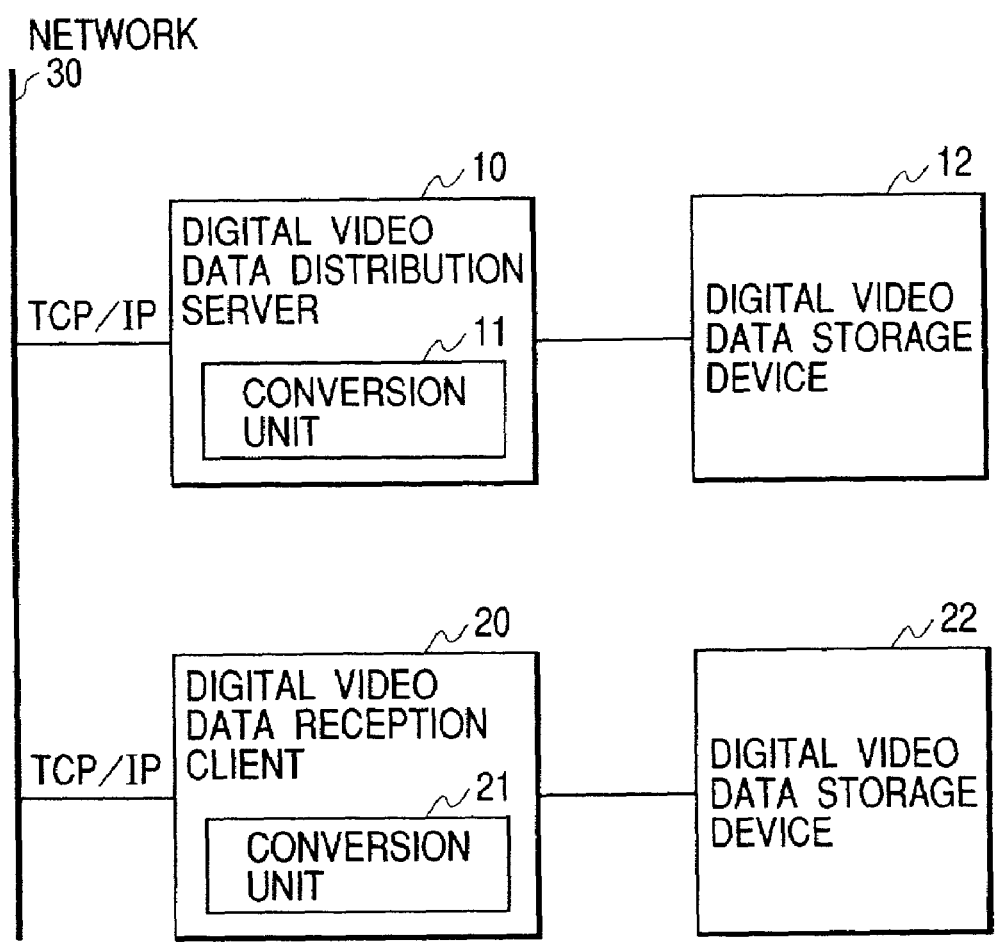
FIG. 1 is a diagram showing a conventional digital video data transmitting and receiving system.
Figure 2:
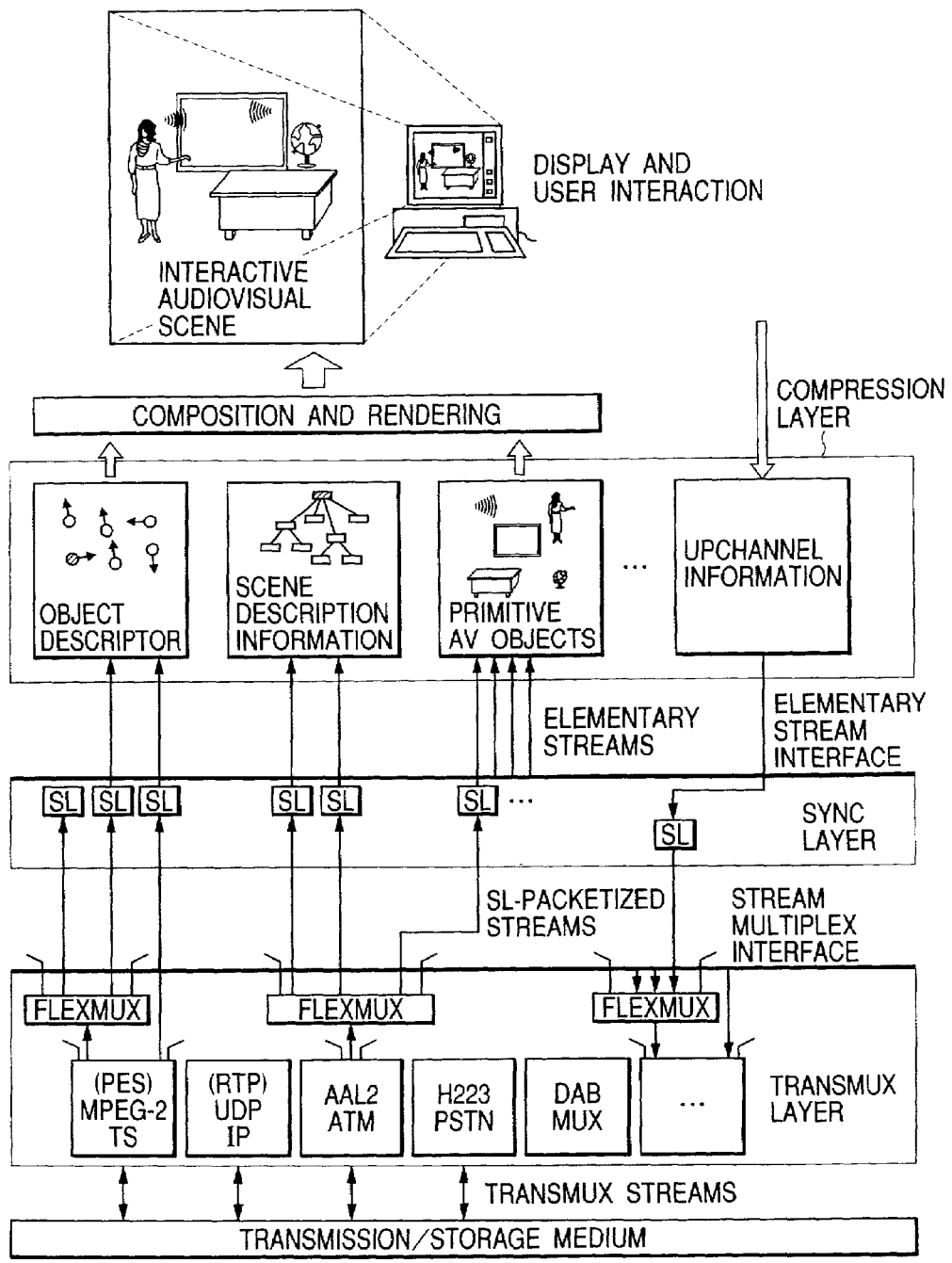
FIG. 2 is a diagram showing the configuration of a conventional MPEG-4 player.
Figure 3:
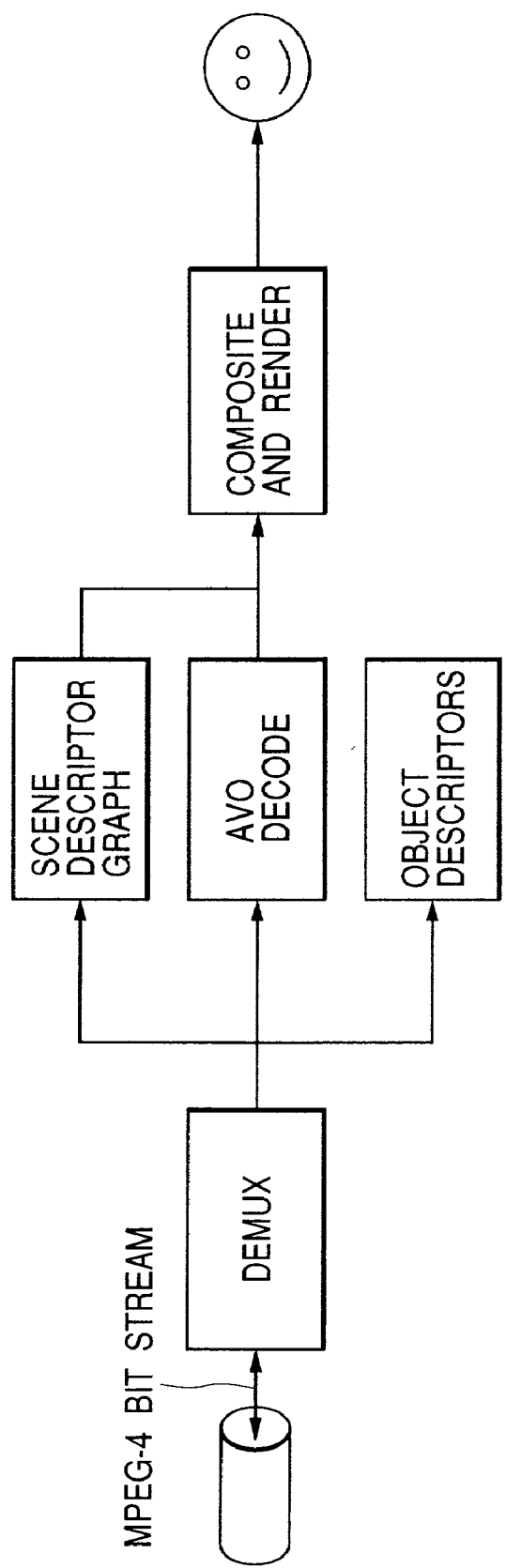
FIG. 3 is a schematic diagram formed by simplifying FIG. 2.
Figure 4:
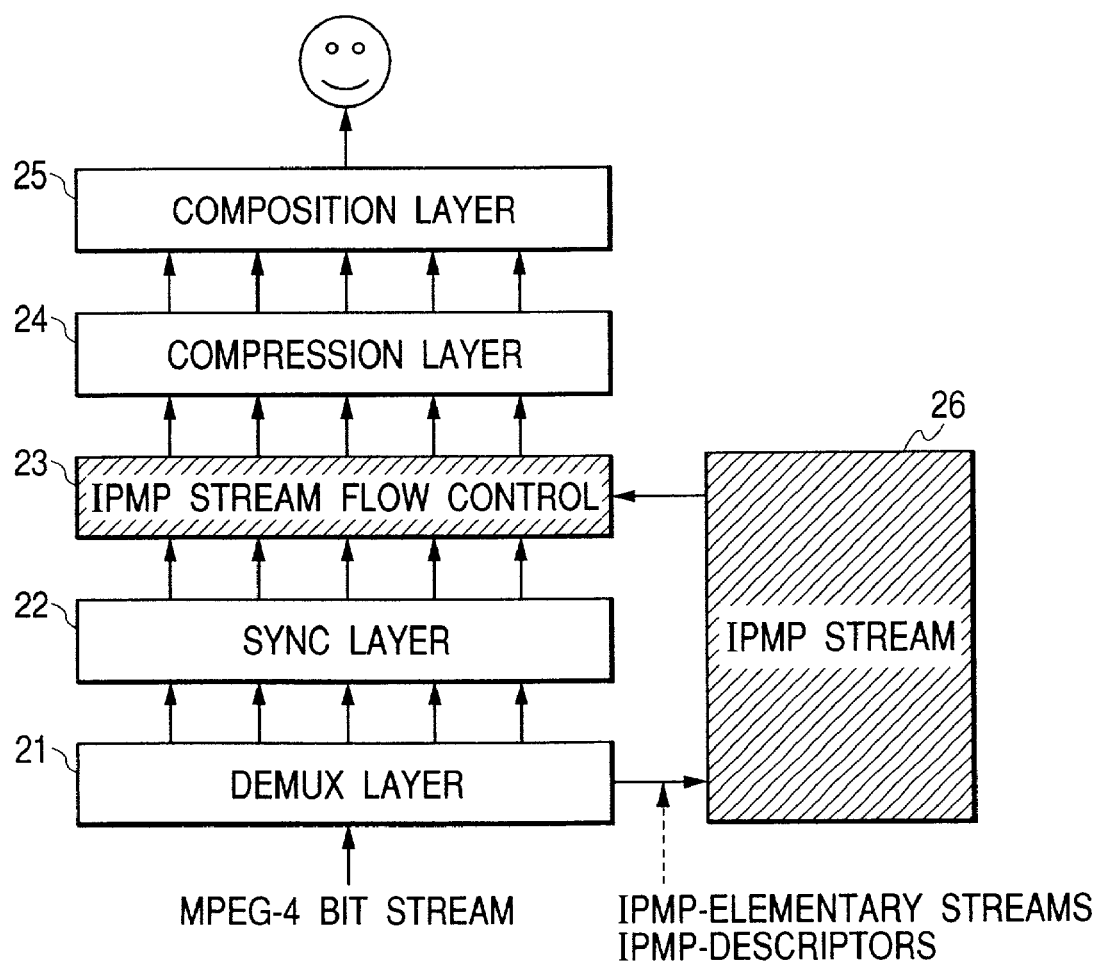
FIG. 4 is a diagram formed by adding a block representing an IPMP System processing section to FIG. 3.
Figure 5:
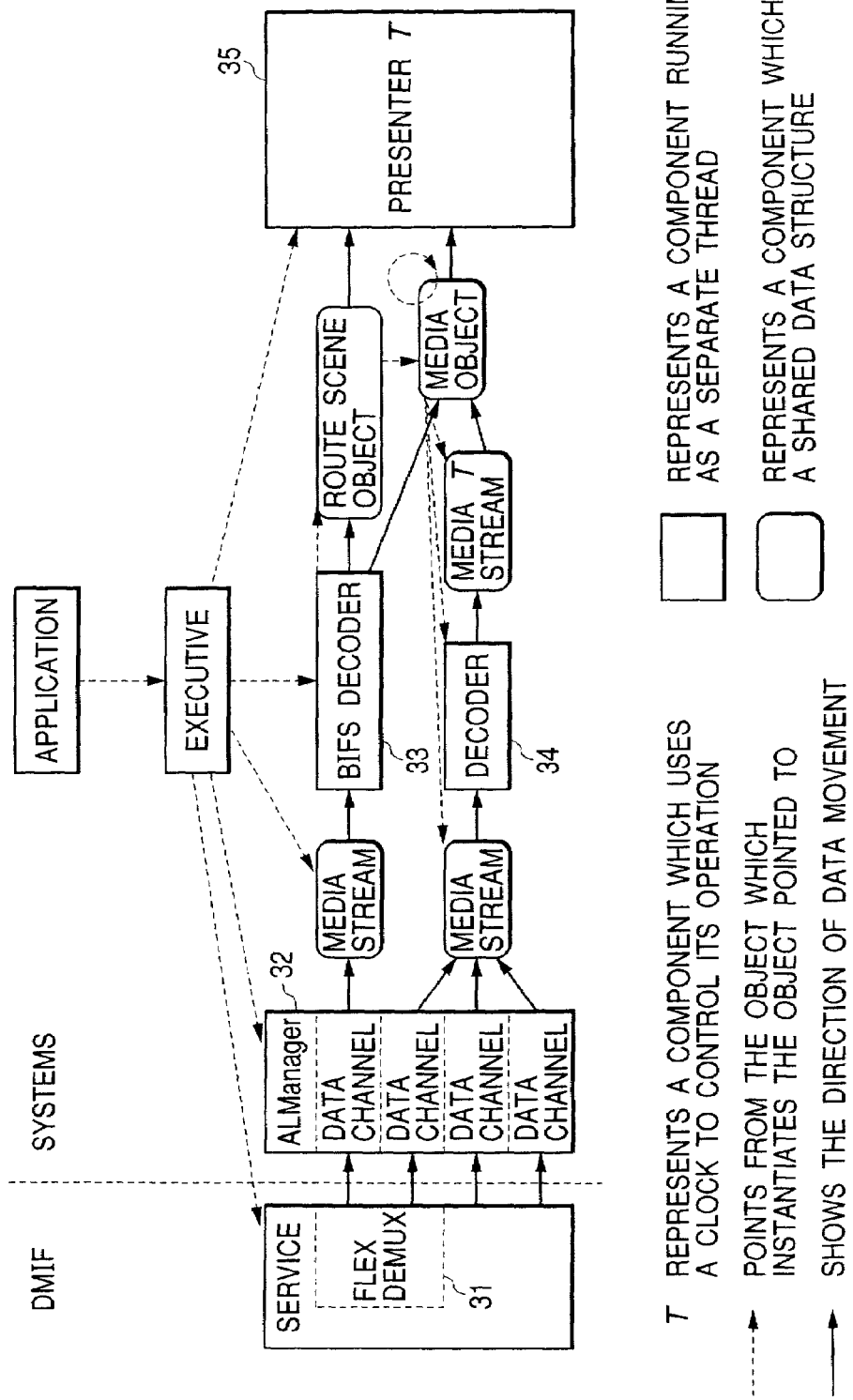
FIG. 5 is a diagram showing internal functional blocks and data flows in an example of an MPEG-4 Player.
Figure 6:
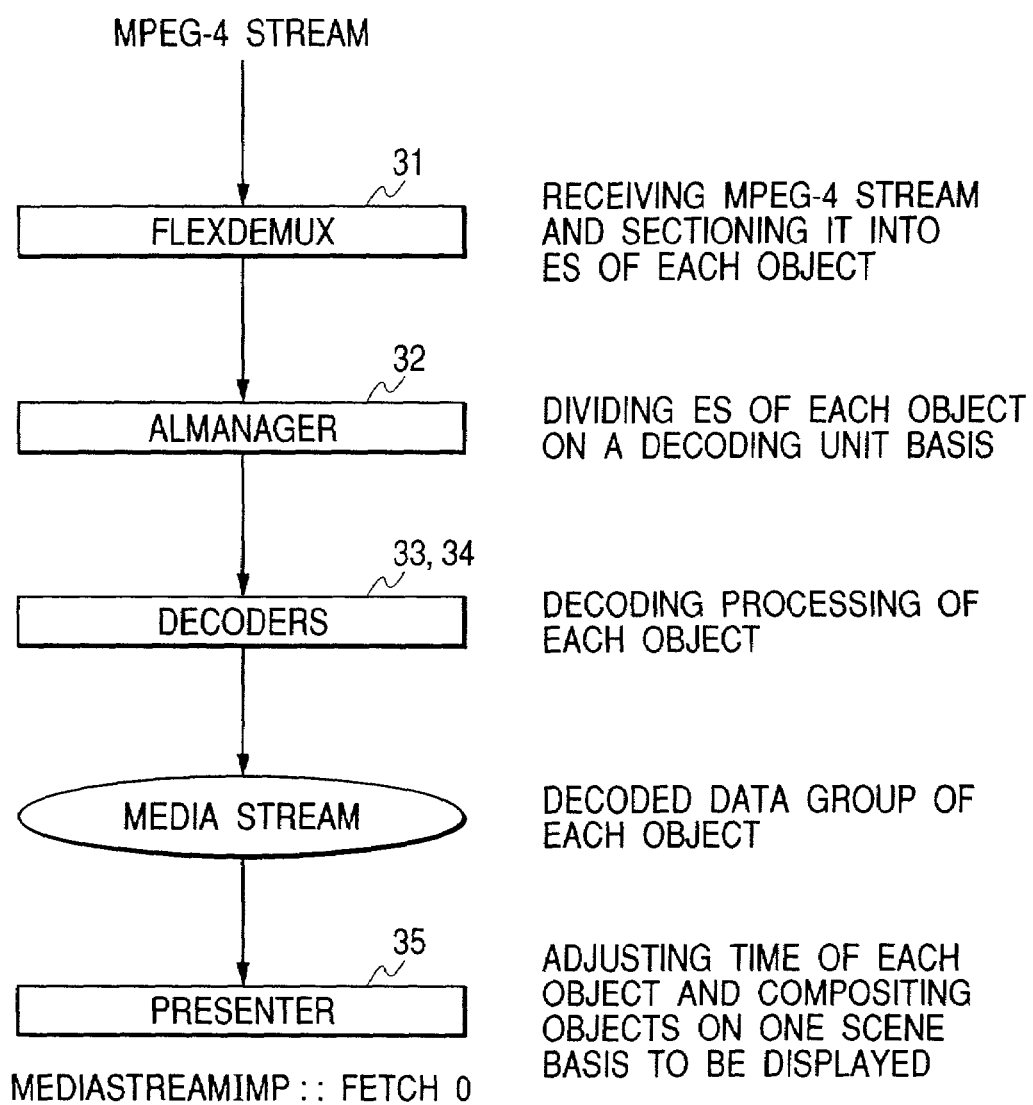
FIG. 6 is a diagram outlining the data processing process shown in FIG. 5.
Figure 7:
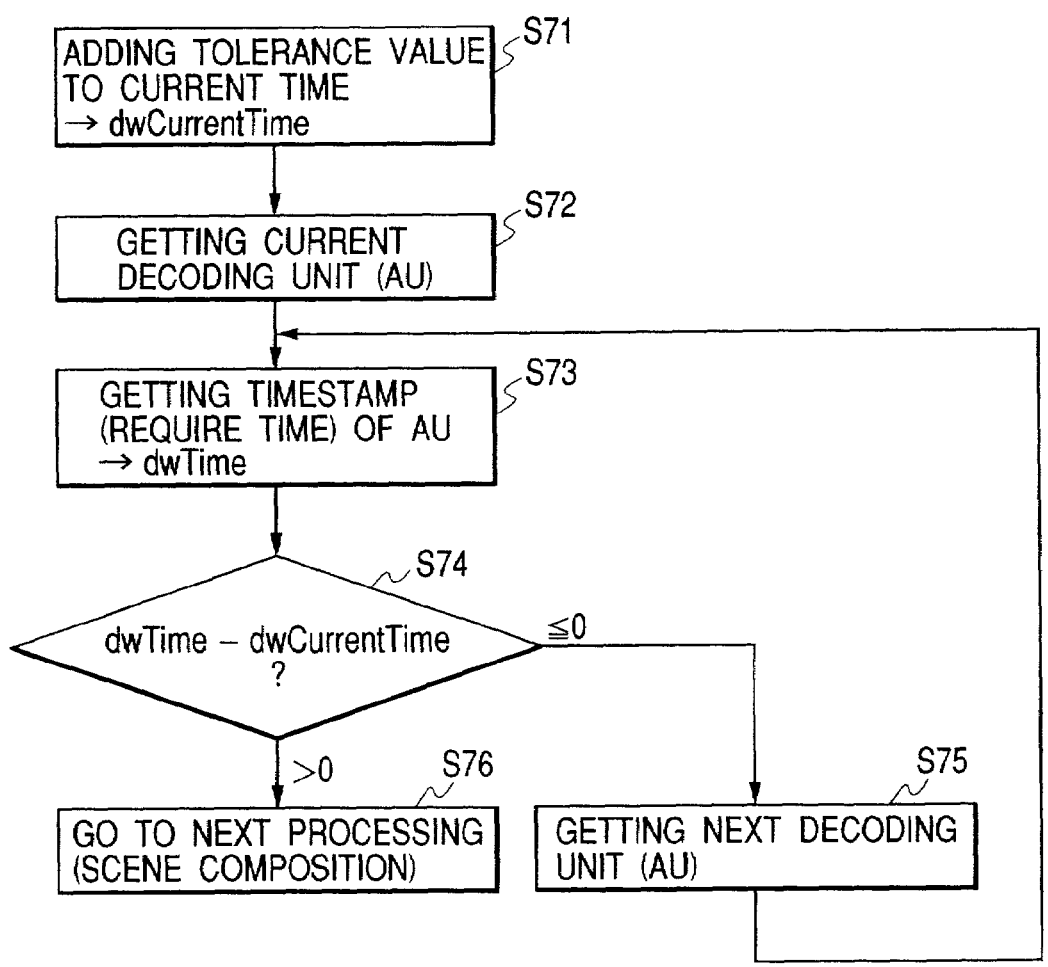
FIG. 7 is a flowchart showing an example of data processing for time adjustment between MPEG-4 object access data units.
Figure 8:
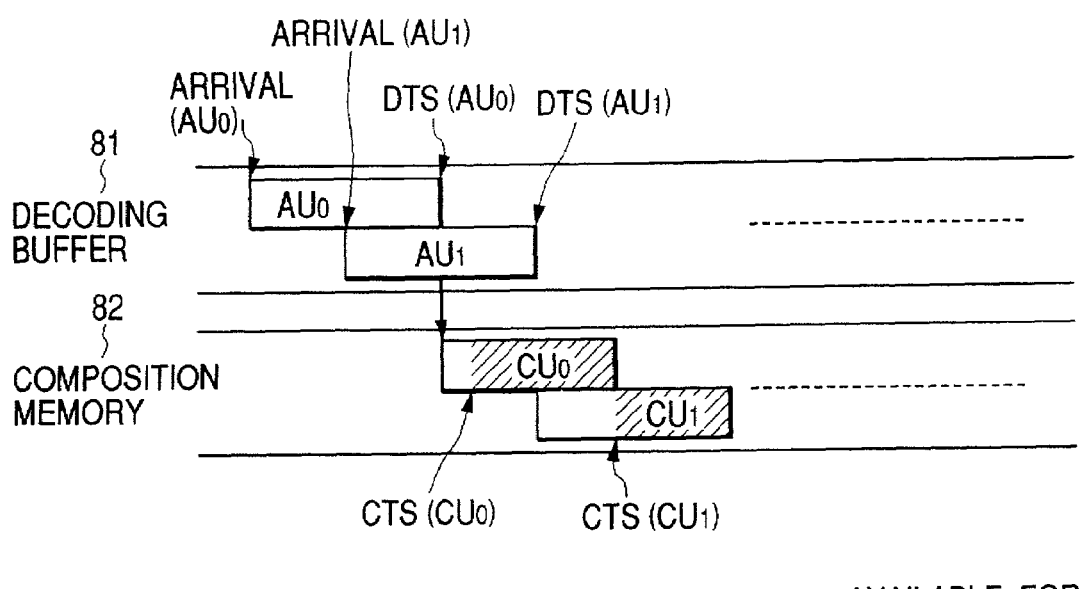
FIG. 8 is a diagram showing shifting and timing of data in a Decoding buffer and a Composition Memory.
Figure 9:
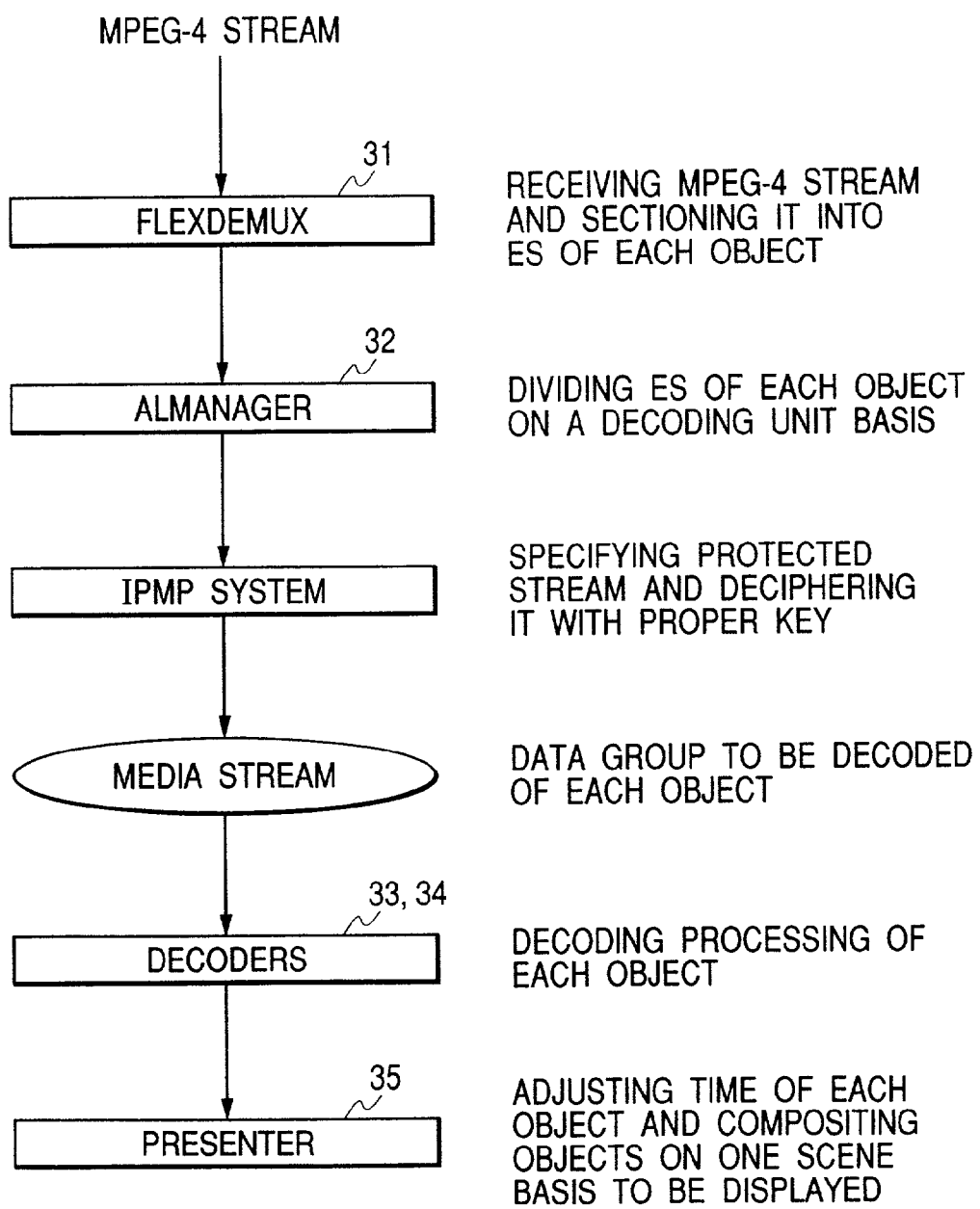
FIG. 9 is a diagram showing a data processing process formed by adding a processing portion in an IPMP System to the process shown in FIG. 6.
Figure 10:
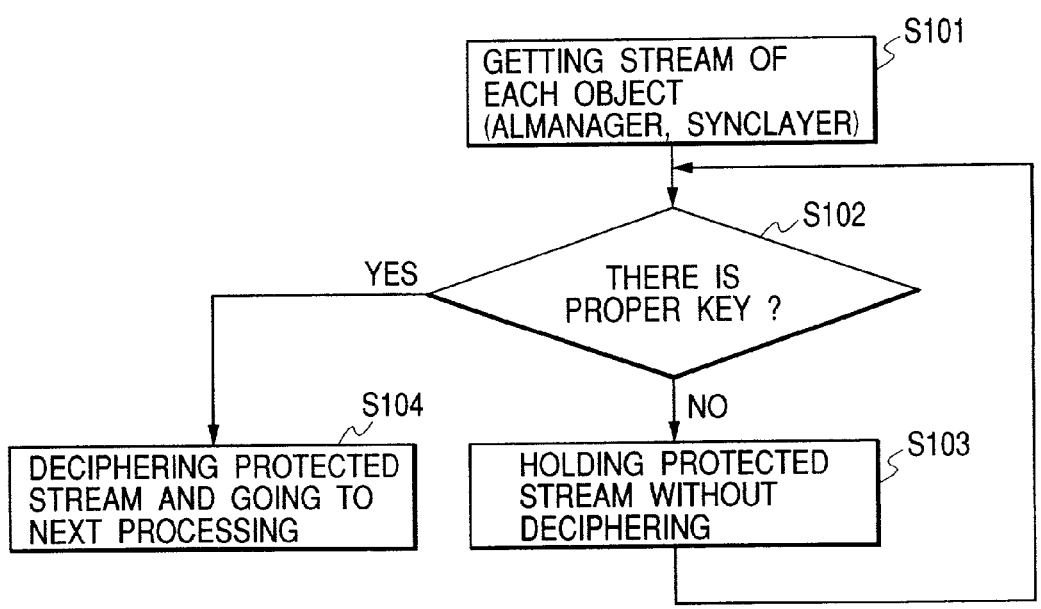
FIG. 10 is a flowchart for showing an example of the operation of the IPMP System shown in FIG. 4.
Figure 11:
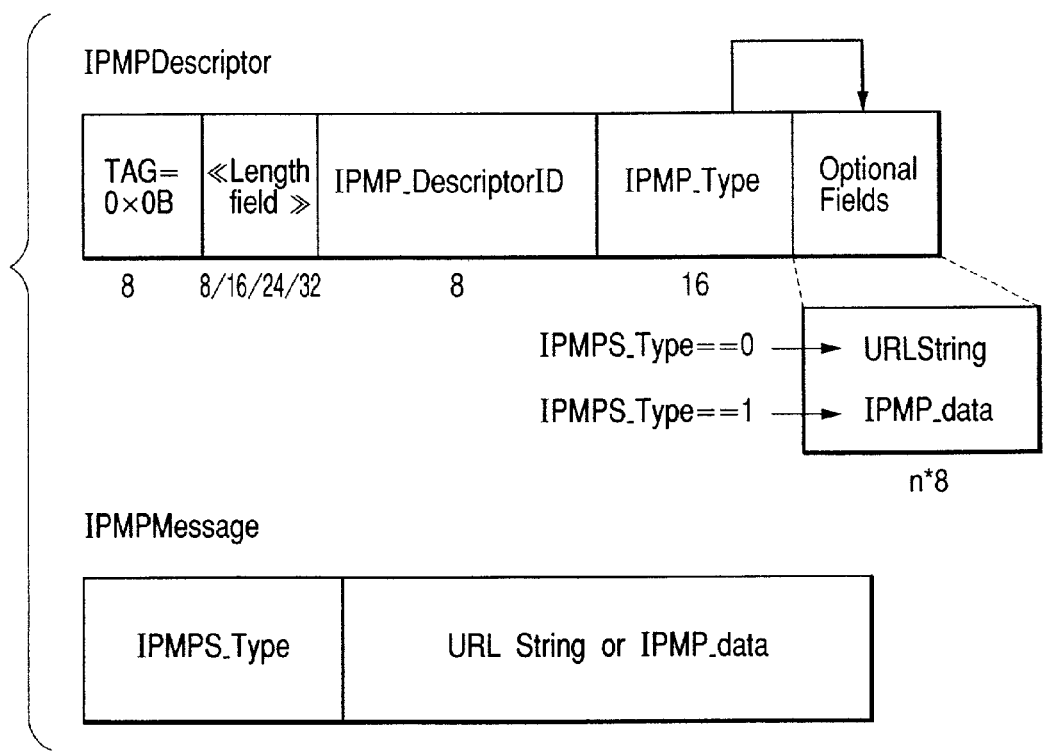
FIG. 11 is a diagram for explaining an IPMPDescriptor and an IPMPMessage.
Figure 21:
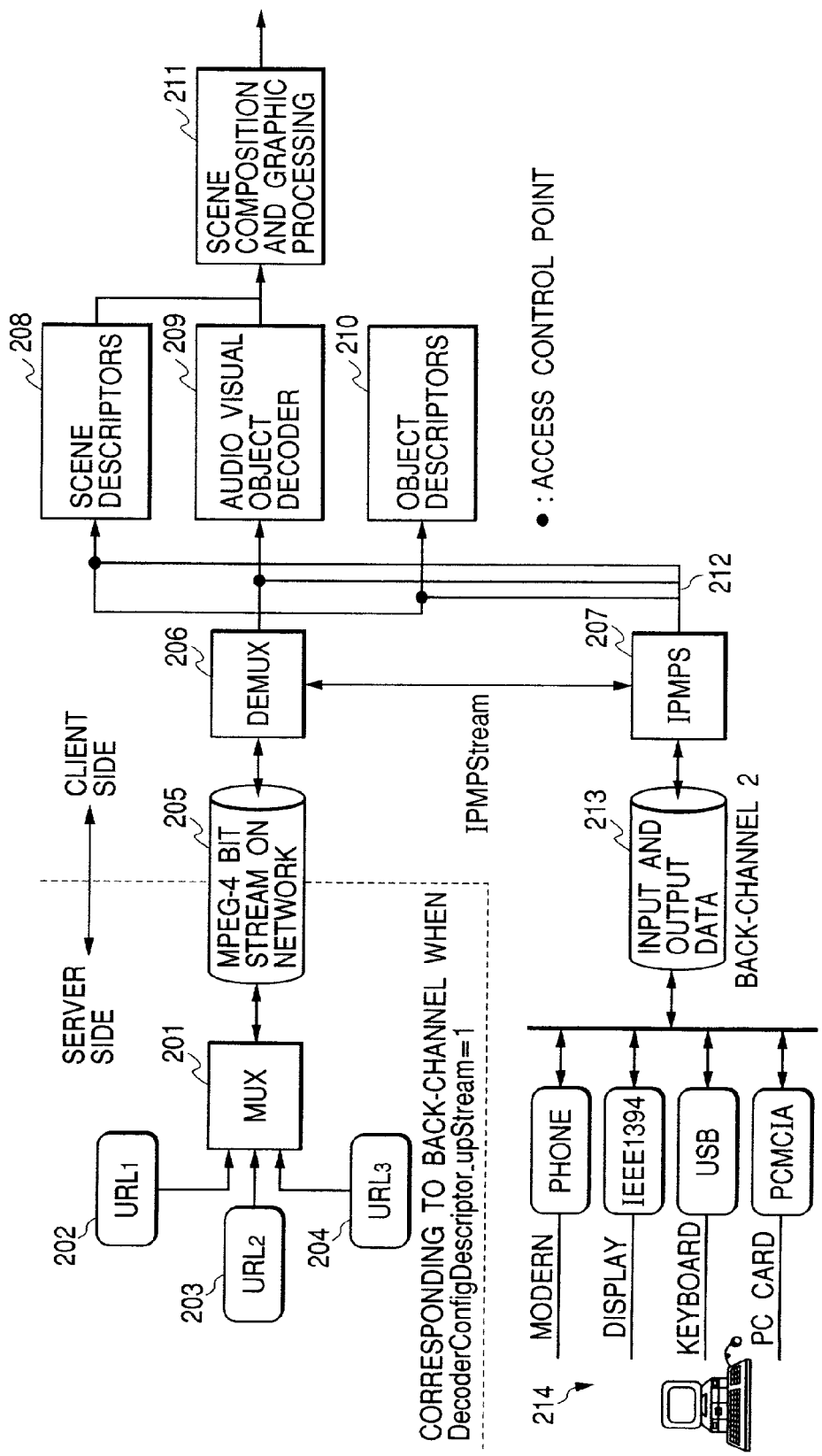
FIG. 21 is a diagram showing the configuration of an MPEG-4 player using a back-channel in a preferred embodiment of the present invention.

FIG. 21 is a diagram schematically showing the configuration of a system including an MPEG-4 player in a preferred embodiment of the present invention. The system shown in FIG. 21 is arranged to realize "IP Protection" by operating "IP Data Set". The system shown in FIG. 21 differs from that shown in FIG. 3 in that it has an Intellectual Property Management and Protection System (IPMPS) 207 and realizes a copyright authentication and protection function by the IPMPS 207.

Figure 22:
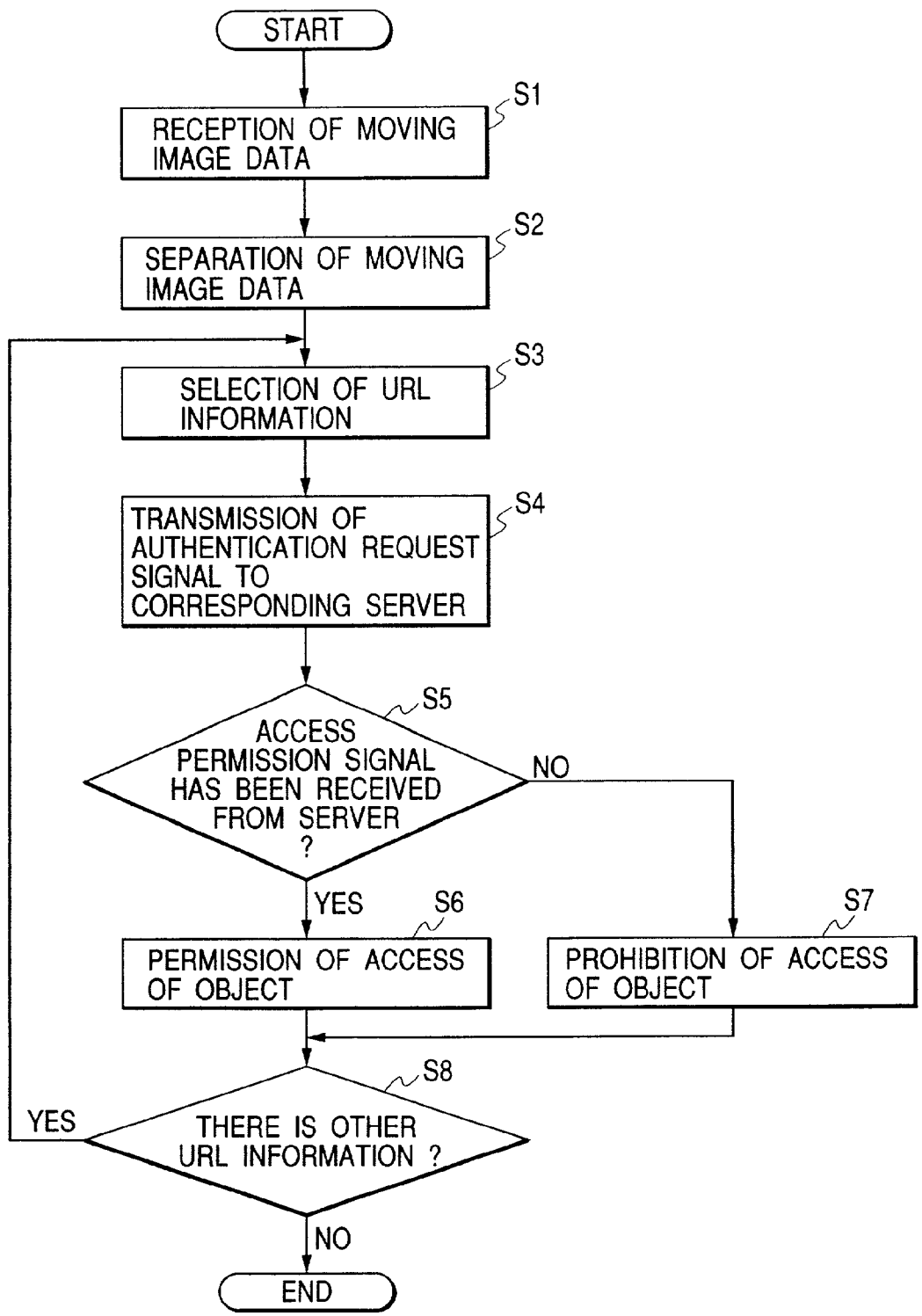
FIG. 22 is a flowchart of the operation of a client relating to authentication processing.

FIG. 22 is a flowchart of the operation of a client relating to authentication processing. The operation of the system shown in FIG. 21 will be described below with reference to FIG. 22.

In a server, a multiplexer 201 receives individual objects from a plurality of network sites 201 to 204 having different URLs (Uniform Resource Locators): $URL_1$, $URL_2$, and $URL_3$. and forms moving picture data formed of these plurality of objects. This moving picture data is transmitted as an MPEG-4 bit stream 205 to a client over a network by a request from the client.

In step S1, the client receives MPEG-4 bit stream 205 from the server. To each of the objects constituting this MPEG-4 bit stream 205, information designating the corresponding copyright holder (information on the URL in this embodiment) is attached.

In step S2, the client separates, by a demultiplexer 206, MPEG-4 bit stream 205 into a plurality of streams formed by a plurality of objects and information (including URL information) attached to each object. The URL information attached to each object is supplied to IPMPS 207 as a portion of "IPMP Stream", which is a stream of "IP Data".

In step S3, any information on one URL from the information on one or a plurality of URLs supplied to IPMPS 207 is selected. This may, for example, be designated by an operator or the items of information on the URLs may be successively selected by IPMPS 207 in predetermined order.

In step S4, on the basis of the selected URL information, an authentication request signal is transmitted to a server 202 having the corresponding URL in one or a plurality of servers connected to the network. For this transmission, a back-channel 1 or a back-channel 2 described below is used.

In step S5, transmission of an access permission signal from the server 202 receiving the authentication request signal is awaited. When an access permission signal is received, the process advances to step S6. If no access permission signal is received in a predetermined time period, the process moves to step S7.

In step S6, access to the object allowed to be accessed upon receiving of the access permission signal representing access permission (authentication) is enabled. More specifically, a control signal 212 for controlling an access control point is set in a permitting state to enable scene descriptors 208, an audio visual decoder 209 and object descriptors 210 to access the corresponding stream from the demultiplexer 206 (that is, the stream of the object allowed to be accessed by the access permission signal).

On the other hand, in step S7, control signal 212 for controlling the access control point is set in a prohibiting state to prohibit scene descriptors 208, audio visual decoder 209 and object descriptors 210 from accessing the corresponding stream from the demultiplexer 206 (that is, the stream of the object not allowed to be accessed after requesting authentication).

In step S8, a check is made as to whether or not there is other URL information. If there is remaining URL information, the process returns to step S3. If there is no other URL information, the process ends.

A scene composition and graphic processing section 211 performs scene composition and graphic processing on the basis of data supplied from scene descriptors 208, audio visual decoder 209 and object descriptors 210. At this time, only one of the objects allowed to be accessed may be used as a composition object, or reproduction of any one of the related objects may be prohibited unless all the objects are simultaneously allowed to be accessed.

The above-described authentication processing will be further described in more detail.

The MPEG-4 bit stream includes "ES_Descriptor" which describes the contents of each of "Elementary Streams" (ES) formed on an object basis, and "OD_Descriptor" which describes each object itself. If "ES_Descriptor" or "OD_Descriptor" contains a command for remote access and URL information designating an access destination, remote access is executed by a procedure such as shown in FIG. 23.

Figure 23:
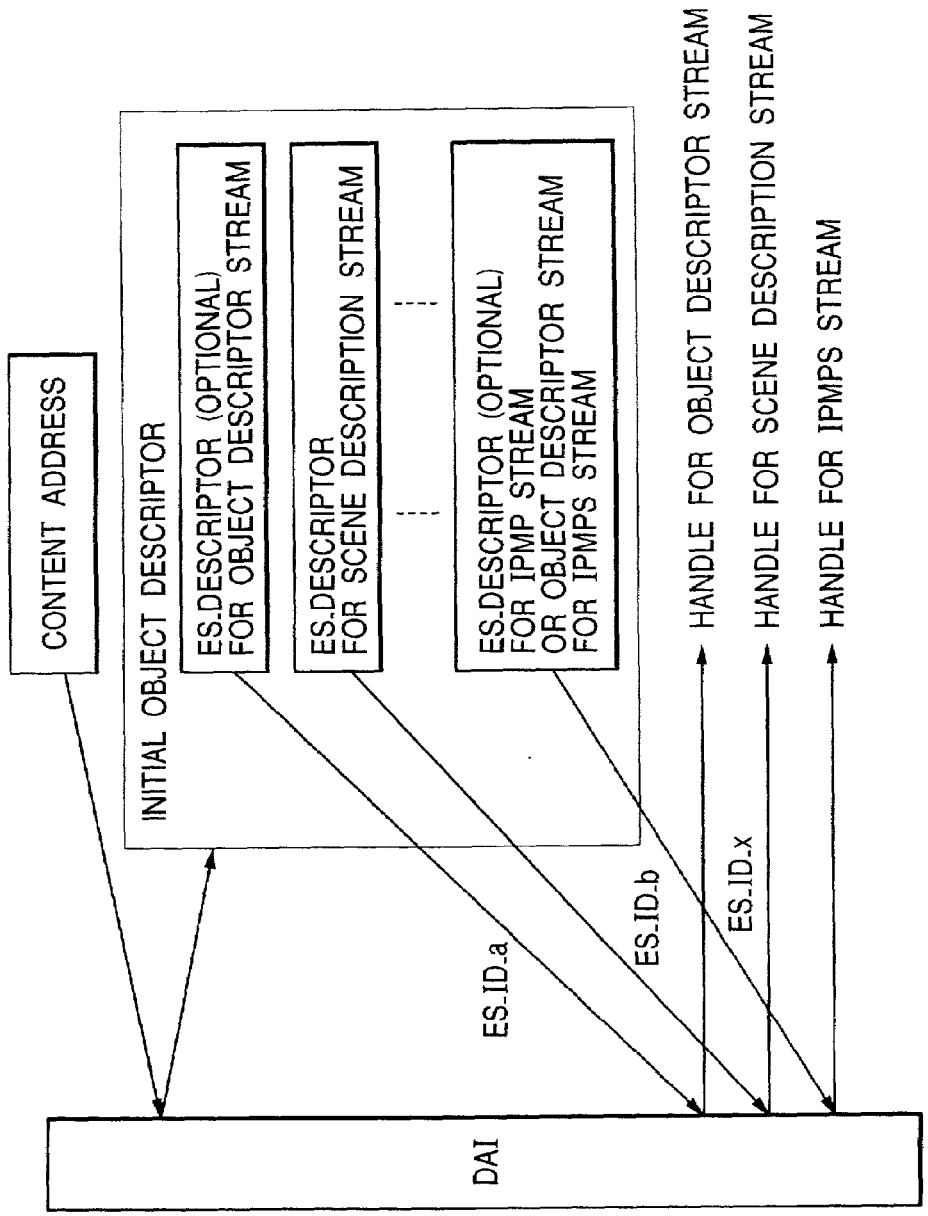
FIG. 23 is a schematic diagram for explaining remote access.

FIG. 23 is a schematic diagram for explaining remote access.

Referring to FIG. 23, "DAI" is an interface layer for interfacing between the MPEG-4 bit stream and the network, called "DMIF Application Interface". Details of this layer are described in paragraph "ISO/IEC 14496-6 DMIF Document DMIF Application Interface", and will not be explained in this specification.

Also, the MPEG-4 bit stream has "DecoderConfigDescriptor" showing information on the kind of decoder corresponding to an "elementary stream" (ES). This "DecoderConfigDescriptor" is a structure formed of several data elements, one of which is a one-bit upStream parameter designating a stream type. Details of this data element are described in paragraph "ISO/IEC 14496-1 FCD 8.3.4 DecoderConfigDescriptor", and will not be explained in this specification.

An example of "DecoderConfigDescriptor" is shown in Expression 1.

Expression 1: DecoderConfigDescriptor

```
aligned(8) class DecoderConfigDescriptor
        : bit(8) tag=DecoderConfigDescrTag {
            bit(8) length;
            bit(8) objectProfileIndication;
            bit(6) streamType;
            bit(1) upstream;
            const bit(1) reserved = 1;
            bit(24) bufferSizeDB;
            bit(32) maxBitrate;
            bit(32) avgBitrate;
            DecoderSpecificInfo decSpecificInfo[ ];
        }
```

Identification of streams is performed on the basis of the value of "streamType" which is a data element in the class declaration of "DecoderConfigDescriptor" in Expression 1. The value of "streamType" is defined as shown in Table 3.

TABLE 3

Stream Type Designation Values

| Stream Type Designation Values | Stream Types |
|---|---|
| 0 × 00 | reserved for ISO use |
| 0 × 01 | ObjectDescriptorStream |
| 0 × 02 | ClockReferenceStream |
| 0 × 03 | SceneDescriptionStream |
| 0 × 04 | VisualStream |
| 0 × 05 | AudioStream |
| 0 × 06 | MPEG7Stream |
| 0 × 07 | IPMPStream |
| 0 × 08, 0 × 09 | reserved for ISO use |
| 0 × 0A | ObjectContentInfoStream |
| 0 × 0C–0 × 1F | reserved for ISO use |
| 0 × 20–0 × 3F | user private |

In Table 3, a value for identifying "IPMPStream" specific to this embodiment is added to "ISO/IEC 14496-1 FCD Table 0–1: streamType Values. The parameters and terms in Table 3 are the same as those in "ISO/IEC 14496-1 FCD" and will not be explained in this specification.

As shown in FIG. 21, when "DecoderConfigDescriptor.upStream", which is a flag designating the direction of a stream is "1", the system is in an "upstream state" in which a stream is transferred from the client side to the server side. A transfer function using this "upstream" state is called "back-channel 1".

During ordinary reproduction, "DecoderConfigDescriptor.upStream" is zero and the system in a "downstream" state in which a stream is transferred from the server side to the client side. On the other hand, in a case where a request for permission to access to an object is made, "DecoderConfigDescriptor.upStream" is set to "1" to use "back-channel 1" for "upstream" of necessary data to a URL destination. Through this channel, "IPMP Management Data" (intellectual property right management information) is transmitted as "IPMPStream" to the server side. This remote access enables transfer of response data from the URL destination.

"IPMPStream" shown in Table 3 is constituted by "IPMP_ES" and "IPMP_D". One "IPMP_ES" is formed by a sequence of "IPMP_Messages".

Expression 2 represents an example of description of "IPMP_Messages".

Expression 2: IPMP_Message

```
class IPMP_Message(){
    unsigned int(8)    IPMPS_TypeCount;
    bit(1) hasURL;
    int i;
    for (i = 0; i < IPMPS_TypeCount; i++){
        unsigned int(16) IPMPS_Type[[i]];
        unsigned int(32) offset[[i]];
        unsigned int(16) length[[i]];
    }
    if (hasURL){
        unsigned int(15) lengthOfURLbits;
        bit(3)reserved=0b111;
        unsigned int(lengthOfURLbits)lengthOfURL;
        char(8) URLString[lengthOfURL];
    }
    for (i = 0; i < IPMPS_TypeCount; i++){
        char(8) IPMP_data[length[i]];
    }
}
```
In Expression 2, "IPMPS_TypeCount" represents the number of different "IPMPS types". Therefore, different IPMPSs can exist and "IPMP messages" can be adapted to a plurality of IPMPSs.

If a URL is designated, "IPMPS_TypeCount" has "0" and other minimum values "1". In this case, "IPMP_Message" externally stored is referred to and used instead of internal "IPMP_Message".

Also, "IPMPS_D" is formed by "IPMP Descriptor". This "IPMP Descriptor" is a data structure for fine IPMP control with respect to each of "elementary streams". Further, "IPMP Descriptor Updates" is executed as a portion of an object Descriptor stream. Equation 3 represents an example of description of "IPMP Description Updates".

Expression 3: IPMP_DescriptorUpdate

```
aligned(8) class IPMP_DescriptorUpdate: unit(8)
IPMP_DescriptorUpdateTag{
    unsigned int(8)    descriptorCount;
    int i;
    for (i = 0; i < descriptorCount; i++){
        IPMP_Descriptor    d[[i]];
    }
}
```
In Expression 3, "descriptorCount" represents the number of "IPMP_Descriptors" to be updated, and d[i] represents one "IPMP_Descriptor".

Expression 4: IPMP_Descriptor

```
class IPMP_Descriptor( ){
    bit(8)    IPMP_Descriptor_ID;
    unsigned int(8)    IPMPS_TypeCount;
    bit(1)    hasURL;
    int i;
    for (i = 0; i < IPMPS_TypeCount; i++){
        unsigned int(16)    IPMPS_Type[[i]];
        unsigned int(32) offset[[i]];
        unsigned int(16) length[[i]];
    }
    if (hasURL){
        unsigned int(5) lengthOfURLbits;
        bit(3) reserved=0b111;
        unsigned int( lengthOfURLbits) lengthOfURL;
        char(8)    URLString[lengthOfURL];
    }
    for (i = 0; i < IPMPS_TypeCount; i++){
        char(8) IPMP_data[length[i]];
    }
}
```
In Expression 4, "IPMP_Descriptor_ID" is a number uniquely assigned to each "IPMP_Descriptor", "ES_Descriptors" refers to "IPMP_Descriptors" by using "IPMP_Descriptor_ID", and "IPMPS_TypeCount" represents the number of different IPMPSs designated by "IPMP_Message".

Figure 24:
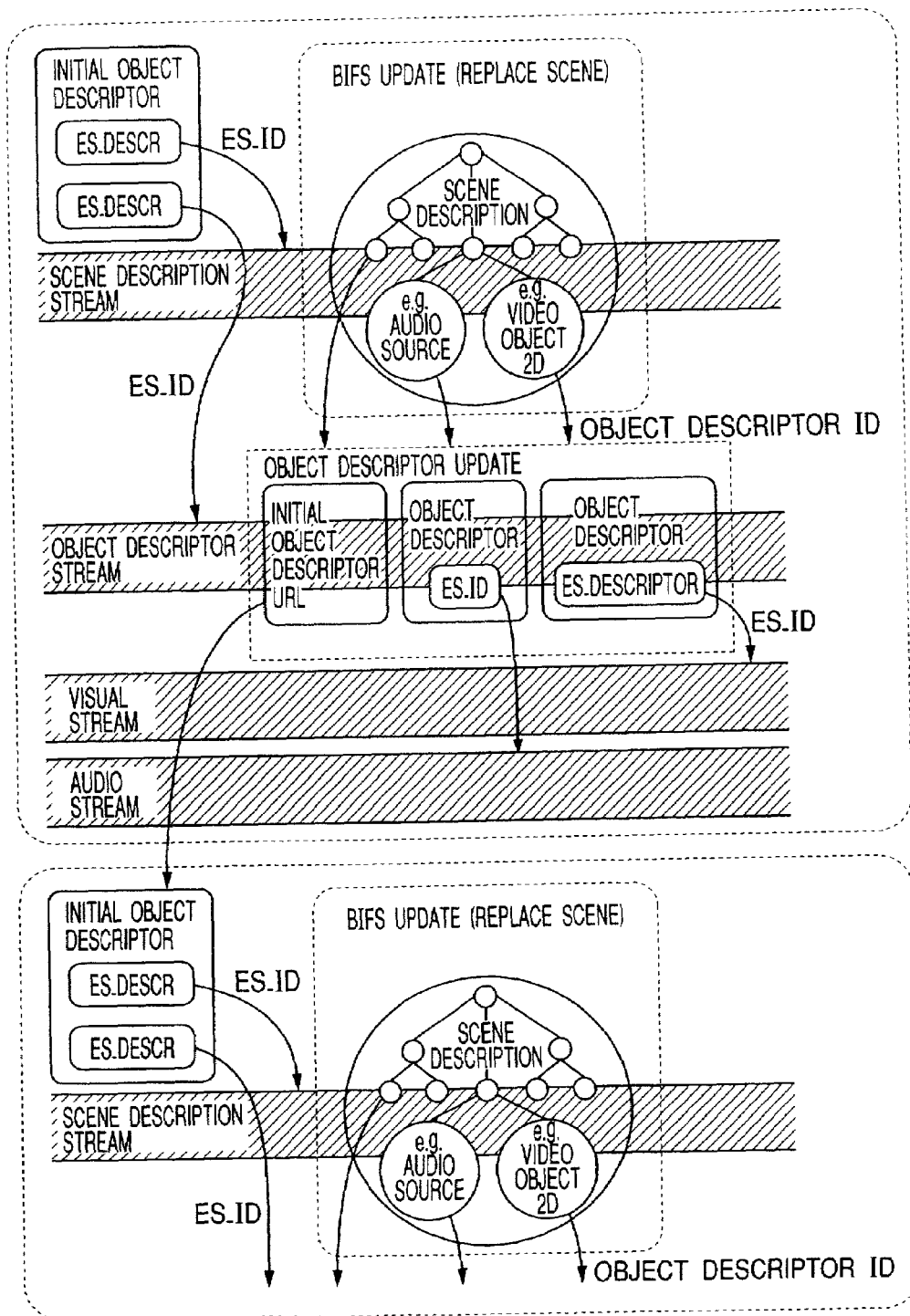
FIG. 24 is a diagram showing an example of a hierarchical structure in a case where there is a further designated URL from a URL destination.

FIG. 24 is a diagram showing an example of a hierarchical structure in a case where there is a further designated URL from a URL destination. Needless to say, while an example of a two-strata structure is illustrated in FIG. 24, a three-strata structure, a four-strata structure, and so on may be formed if there are further designated URLs. Although "IPMPStream" is not understandably shown in FIG. 24, "IPMP_ES" or "IPMP_D" relating to an object remote-designated is decoded or remote-accessed in correspondence with "SceneDescriptionStream" or "ObjectDescriptorStream" when necessary, as is that shown in FIG. 23.

Authentication processing using the "upstream" state of an MPEG-4 bit stream, i.e., back-channel 1, has been described. However, such authentication processing using back-channel 1 is "upstream" processing at the time of real-time reproduction of a bit stream. Therefore, it is particularly intended for high-speed processing of a comparatively small amount of data requiring only a short processing time. In a system performing a real-time reproduction, it is desirable to minimize the delay due to remote access and authentication through "back-channel 1".

Even when the amount of data is small, a substantially long time may be required to complete authentication. Therefore, the delay in communication through "back-channel 1" is a consideration. A preferred solution of this problem worked out by considering an allowable delay time and a need for interactive operability is to provide a second "back-channel".

In this embodiment, therefore, an I/O (inter-device input/output) interface different from that for MPEG-4 bit stream transmission is provided. A channel through this interface is hereinafter referred to as "back-channel 2".

Before describing authentication processing using "back-channel 2", the relationship between the amounts of data and the delay times of "back-channel 1" and "back-channel 2" will first be discussed. According to a report from "MPEG-4 Requirement Group", an allowable delay time of "back-channel" not detrimental to real-time reproduction is one frame period. Table 4 shows the relationship between "back-channel 1" and "back-channel 2" with respect to the supposed amounts of data and transfer rates determined on the basis of this allowable delay time.

TABLE 4

| Name | Purpose | Amount of data | Delay time |
|---|---|---|---|
| back-channel 1 | High-speed IPMP remote access for authentication | 3000 to 5000 bits/s | 100 to 300 ms |
| back-channel 2 | Low-speed IPMP input/output access for authentication | | >500 ms |

In the case of high-speed IPMP remote access for authentication, an amount of data within 100 to 500 bit/frame can be processed through a 3 to 5 k/sec transmission line according to a limit to the delay time. Table 4 can be regarded as a delay-bandwidth relationship as a result of "remote content access" by a "back-channel" according to "IPMP_Message" data, "IPMP_Descriptor" data and URL designation. Therefore, the amount of data for actual authentication is restricted. On the other hand, authentication consumes time in an asynchronous relationship with stream processing.

It is also supposed that authentication for obtaining a plurality of objects will require communication not with only one site but with a plurality of sites. In such a case, the condition as shown in Table 4 becomes more difficult to satisfy and the system is not practically usable. Therefore, it is preferable to use "back-channel 2" for an authentication procedure for which low-speed processing in an asynchronous relationship with stream processing may suffice.

Processing using "back-channel 2" will be described below. As shown in FIG. 21, "back-channel 2" for low-speed IPMP input/output access for authentication is provided as an I/O (inter-device input/output) interface basically different from that for MPEG-4 bit stream transmission.

A computer terminal 214 having a keyboard, a display and a modem is provided externally to "back-channel 2". The computer terminal 214 is connected to a telephone line and to IPMPS 207. In this arrangement, the computer terminal 214 receives, from IPMPS 207, information on objects in a stream with which authentication is required, and information on an authenticator managing the object, and indicates the received information on the display. An operator selects some of the objects in the stream with which authentication is required by referring to the information on the display. The computer terminals 214 make a telephone call to the authenticator, receives information on an authentication process and an access code, and indicates the contents of the received information on the display. When the operator inputs the received information by using the keyboard, the IPMPS 207 is informed of the input information and sets the necessary object to be accessible.

While a case of using a telephone line has been described by way of example, a cable for cable television or a wireless communication channel, for example, may alternatively be used.

A personal computer card (PC card) in which information necessary for access authentication obtained in advance under contract with the authenticator is stored may be used if necessary. The PC card is inserted into a PCMCIA interface of the computer terminal 214 to inform IPMPS 207 of the information necessary for access authentication, thereby setting the necessary object to be accessible.

In a case where an authentication process requiring a substantially long operating and/or authentication time, the above-described low-speed processing is effective under a non-real-time condition, such as when stream reproduction is started, or at the time of a scene change.

As described above, in this embodiment, "back-channel 1" and "back-channel 2" may be selectively used according to use. The system may be arranged so that one of these channels can be selected by an operator, or so that processing in the system is performed by considering a delay time limit, or the like, to optimize the selection.

As described above, two different types of "back-channels" are provided to realize highly flexible authentication processing.

The present invention may be applied to a system constituted by a plurality of devices or a system constituted by one device.

The inventor of the present invention intends to include a device or a method constituted by one constituent in the entire sets of constituents of the devices or methods corresponding to the above-described embodiments in the scope of the invention claimed by the inventor.

The functions of each of the devices in the above-described embodiments can also be realized in such a manner that a storage medium on which program codes are recorded is temporarily or fixedly set in a system or a device, and a computer (or a CPU or a microprocessor unit (MPU)) in the device or system reads out the program codes stored on the storage medium. In this case, the program codes themselves read out from the storage medium or the storage medium itself constitutes the invention legally claimed.

The recording medium for supplying such program codes is, preferably, for example, a floppy disk, a hard disk, an optical disk, a magneto-optical disc, a compact disk-read only memory (CD-ROM), a compact disk-readable (CD-R), a magnetic card, a memory card using a non-volatile memory, or a read-only memory, or the like. However, any other medium may be used as the recording medium in accordance with the present invention.

The technical scope of the present invention covers a mode of implementation of the invention in which a computer executes program codes read out from a recording medium to realize the functions specific to the present invention, and in which an operating system (OS) or the like running on the computer shares a part of actual processing or performs the entire processing in accordance with instructions based on the program codes.

The technical scope of the present invention also covers a mode of implementation of the invention in which program codes read out from a storage medium are written to a memory provided in a functional extension board inserted in a computer or a functional extension unit connected to the computer, and a CPU or the like provided on the functional extension board or the functional extension unit shares a part of actual processing or performs the entire processing in accordance with instructions based on the program codes.

As described above, in a system according to the present embodiment, which enables a client/user to obtain contents or object data from a contents provider server, each content or object data is formed as MPEG-4 data in accordance with an international standard specification ensuring mutual compatibility, as shown in FIG. 12, to which private IPMP data, such as a public key and passwords, necessary for encryption for security, forming a digital watermark, decryption, and removal of the digital watermark, is attached. By using such a system, a service for distributing digital contents data protected with desired security can be provided, as described below.

1. A service is offered to convert IPMP information proper to a content or an object which a user wishes to reproduce into IPMP System information proper to a reproduction device in possession of the user. The MPEG-4 data portion of the obtained content or object data formed in accordance with the international standard specification and having mutual compatibility is not changed by this conversion. On the other hand, the private IPMP data, e.g., a public key and passwords, necessary for encryption for security, forming a digital watermark, decryption, and removal of the digital watermark is converted into the form corresponding to the user's IPMP system. Thus, the security of the content or object data is maintained.
2. If one content is formed of objects having a plurality of different kinds of IPMP information, a vicarious agency service for performing user authentication with each of IPMP System servers managing the objects is performed at user's request, or the like.

As described above, each of a plan to provide a common IPMP platform and a plan to determine one standard IPMP System entails a drawback.

If an intermediate digital contents distribution service provider offering the above-described services 1 and 2 exists, the following effects can be obtained.

1) A user can reproduce a content having IPMP System information different from that of the IPMP system of a device with which the user wishes to reproduce the content, or a content formed of a plurality of objects.
2) It is not necessary for original contents/object data distributors to disclose their security systems to ordinary users. Also, there is no need for providing one unified standard IPMP System. It is therefore possible to construct a security system such as to meet a demand from a content (or object) right holder.
3) The problem in terms of operability for users and restrictions on the system due to the existence of different IPMP systems can be solved or reduced, thereby achieving interoperability of the IPMP System on the content/object data supply side with users.

According to the present embodiment, as described above, a user can reproduce a content with a protection system different from an intellectual property right protection system of a device with which the user wishes to reproduce the content, or a content formed of a plurality of objects. On the other hand, it is not necessary for original contents/object data distributors to disclose their security systems to ordinary users, and there is no need for providing one unified standard intellectual property right protection System (e.g., IPMP System). Therefore, a security system according to a demand from a content (or object) right holder can be constructed. The problem in terms of operability for users and restrictions on the system due to the existence of different intellectual property right protection systems can be solved or reduced, thereby achieving interoperability of the intellectual property right protection System on the content/object data supply side with users.

In other words, the foregoing description of embodiments has been given for illustrative purposes only and not to be construed as imposing any limitation in every respect.

The scope of the invention, is therefore, to be determined solely by the following claims and not limited by the text of the specifications and alterations made within a scope equivalent to the claims fall within the true spirit and scope of the invention.

What is claimed is:

1. A digital contents distribution system having a client, a digital contents server, a roaming server, and a network connected between the client, the digital contents server, and the roaming server,
   wherein said roaming server comprises means:
   for receiving from the digital contents server a digital content protected by a first intellectual property right protection system, wherein the digital content includes information uniquely specifying the first intellectual property right protection system protecting the digital content;
   means for receiving from said client, in a case where said client cannot process said first intellectual property right protection system, change request information for changing the first intellectual property right protection system to a second intellectual property right protection system that said client can process;
   means for changing the first intellectual property right protection system protecting the received digital content to said second intellectual property right protection system based on the change request information, wherein said means for changing the first intellectual property right protection system also changes the information uniquely specifying the first intellectual property right protection system protecting the digital content to information uniquely specifying the second intellectual property right protection system; and
   means for transmitting the digital content protected by the second intellectual property right protection system to said client,
   wherein the first and second intellectual property right protection systems each comprise an IPMP System, and
   wherein IPMPS Type in IPMP Descriptor IPMP Message prescribed in ISO/IEC SC29 14496-1 IS:1998 is used to identify the IPMP system.

2. A system according to claim 1, wherein said roaming server includes means for vicariously executing authentication between said client and said digital contents server.

3. A system according to claim 1, wherein the digital content comprises digital data encoded in accordance with MPEG-4.

4. A system according to claim 1, wherein said client includes means for transmitting information on IPMP-S_Type available for the client to said roaming server.

5. A system according to claim 4, wherein said client includes means for transmitting IP_address (Internet Protocol address) information for identification of said client.

6. A system according to claim 4, wherein said client includes means for transmitting URL (Uniform Resource Locator) information for identification of the digital content.

7. A digital contents distribution system having a client, a roaming server, and a network connected between the client and the roaming server,
   wherein said roaming server comprises:
   means for receiving from said client a digital content protected by a first intellectual property right protection system, wherein the digital content includes information uniquely specifying the first intellectual property right protection system protecting the digital content,
   means for receiving from said client, in a case where said client cannot process said first intellectual property right protection system, change request information for changing the first intellectual property right protection system to a second intellectual property right protection system that said client can process, means for changing the first intellectual property right protection system protecting the received digital content to the second intellectual property right protection system based on the change request information, wherein said means for changing the first intellectual property right protection system also changes the information uniquely specifying the first intellectual property right protection system protecting the digital content to information uniquely specifying the second intellectual property right protection system, and means for transmitting the digital content protected by the second intellectual property right protection system to said client, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

8. A system according to claim 7, wherein the digital content comprises digital data encoded in accordance with MPEG-4.

9. A system according to claim 7, wherein said client includes means for transmitting information on IPMP-S_Type available for the client to said roaming server.

10. A system according to claim 9, wherein said client includes means for transmitting IP_address (Internet Protocol address) information for identification of said client.

11. A system according to claim 9, wherein said client has means for transmitting URL (Uniform Resource Locator) information for identification of the digital content.

12. A roaming server connected to a client and to a digital contents server through a network, comprising:

receiving means for receiving from said digital contents server a digital content protected by a first intellectual property right protection system, wherein the digital content includes information uniquely specifying the first intellectual property right protection system protecting the digital content;

means for receiving from the client, in a case where said client cannot process said first intellectual property right protection system, change request information for changing the first intellectual property right protection system to a second intellectual property right protection system that said client can process;

changing means for changing the first intellectual property right protection system protecting the received digital content to said second intellectual property right protection system based on the change request information, wherein said means for changing the first intellectual property right protection system also changes the information uniquely specifying the first intellectual property right protection system protecting the digital content to information uniquely specifying the second intellectual property right protection system; and transmission means for transmitting to the client the digital content protected by the second intellectual property right protection system, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

13. A roaming server according to claim 12, further comprising means for vicariously executing authentication between said client and said digital contents server.

14. A roaming server according to claim 12, wherein the digital content comprises digital data encoded in accordance with MPEG-4.

15. A roaming server according to claim 12, further comprising means for receiving IPMPS Type available for said client.

16. A roaming server according to claim 15, further comprising means for receiving URL (Uniform Resource Locator) information for identification of the digital content.

17. A roaming server according to claim 12, further comprising means for receiving IP_address (Internet Protocol address) information for identification of said client.

18. A roaming server connected to a client through a network, comprising:

receiving means for receiving from said client a digital content protected by a first intellectual property right protection system, wherein the digital content includes information uniquely specifying the first intellectual property right protection system protecting the digital content;

receiving means for receiving from the client, in a case where said client cannot process said first intellectual property right protection system, change request information for changing the first intellectual property right protection system to a second intellectual property right protection system that said client can process, and changing means for changing the first intellectual property right protection system protecting the received digital content to said second intellectual property right protection system based on the change request information, wherein said changing means also changes the information uniquely specifying the first intellectual property right protection system protecting the digital content to information uniquely specifying the second intellectual property right protection system; and transmission means for transmitting to the client the digital content protected by the second intellectual property right protection system, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

19. A roaming server according to claim 18, wherein the digital content comprises digital data encoded in accordance with MPEG-4.

20. A roaming server according to claim 18, further comprising means for receiving information on IPMP-S_Type available for said client.

21. A roaming server according to claim 20, further comprising means for receiving IP_address (Internet Protocol address) information for identification of said client.

22. A roaming server according to claim 20, further comprising means for receiving URL (Uniform Resource Locator) information for identification of the digital content.

23. A digital contents distribution method in a system having a client, a digital contents server, a roaming server, and a network connected between the client, the digital contents server, and the roaming server, said method comprising the steps of:

receiving by the roaming server from the digital contents server a digital content protected by a first intellectual property right protection system, wherein the digital content includes information uniquely specifying the first intellectual property right protection system protecting the digital content;

receiving by the roaming server from the client, in a case where said client cannot process said first intellectual property right protection system, change request information for changing the first intellectual property right protection system to a second intellectual property right protection system that said client can process;

changing by the roaming server the first intellectual property right protection system protecting the received digital content to said second intellectual property right protection system based on the change request information, wherein said means for changing the first intellectual property right protection system also changes the information uniquely specifying the first intellectual property right protection system protecting the digital content to information uniquely specifying the second intellectual property right protection system; and transmitting the digital content protected by the second intellectual property right protection system to the client, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

24. A storage medium storing program codes for executing the digital contents distribution method of claim 23.

25. A digital contents distribution method in a system structured by having a client, a roaming server, and a network connected between the client and the roaming server, said method comprising the steps of:

receiving by said roaming server from said client a digital content protected by a first intellectual property right protection system, wherein the digital content includes information uniquely specifying the first intellectual property right protection system protecting the digital content;

receiving by said roaming server from the client, in a case where said client cannot process said first intellectual property right protection system, change request information for changing the first intellectual property right protection system to a second intellectual property right protection system that said client can process;

changing by said roaming server the first intellectual property right protection system protecting the received digital content to said second intellectual property right protection system based on the change request information, wherein said changing step also changes the information uniquely specifying the first intellectual property right protection system protecting the digital content to information uniquely specifying the second intellectual property right protection system; and transmitting the digital content protected by the second intellectual property right protection system from said roaming server to said client, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

26. A storage medium storing program codes for executing the digital contents distribution method of claim 25.

27. A digital contents distribution method for a roaming server connected to a client and to a digital contents server through a network, said method comprising the steps of:

receiving from said digital contents server a digital content protected by a first intellectual property right protection system, wherein the digital content includes information uniquely specifying the first intellectual property right protection system protecting the digital content;

receiving from the client, in a case where said client cannot process said first intellectual property right protection system, change request information for changing the first intellectual property right protection system to a second intellectual property right protection system that said client can process;

changing the first intellectual property right protection system protecting the received digital content to said second intellectual property right protection system based on the change request information, wherein said changing step also changes the information uniquely specifying the first intellectual property right protection system protecting the digital content to information uniquely specifying the second intellectual property right protection system; and transmitting the digital content protected by the second intellectual property right protection system to the client, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

28. A storage medium storing program codes for executing the digital contents distribution method of claim 27.

29. A digital contents distribution method for a roaming server connected to a client through a network, said method comprising the steps of:

receiving from said client a digital content protected by a first intellectual property right protection system, wherein the digital content includes information uniquely specifying the first intellectual property right protection system protecting the digital content;

receiving from the client, in a case where said client cannot process said first intellectual property right protection system, change request information for changing the first intellectual property right protection system to a second intellectual property right protection system that said client can process;

changing the first intellectual property right protection system protecting the received digital content to said second intellectual property right protection system based on the change request information, wherein said changing step also changes the information uniquely specifying the first intellectual property right protection system protecting the digital content to information uniquely specifying the second intellectual property right protection system; and transmitting the digital content protected by the second intellectual property right protection system to said client, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

30. A storage medium storing program codes for executing the digital contents distribution method of claim 29.

31. A data processing method for a client connected to a digital contents server and a roaming server through a network, comprising the steps of:

receiving a digital content protected by a first intellectual property right protection system, from said digital contents server, wherein the digital content includes information uniquely specifying the first intellectual property right protection system protecting the digital content;

transmitting, to said roaming server, in a case where said client cannot process said first intellectual property right protection system, the received digital content and change request information for changing the first intellectual property right protection system to a second intellectual property right protection system that said client can process; and receiving, from said roaming server, the digital content whose intellectual property right protection system is changed to said second intellectual property right protection system based on the change request information, wherein, in the digital content, the information uniquely specifying the first intellectual property right protection system protecting the digital content is also changed to information uniquely specifying the second intellectual property right protection system, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

32. A data processing method for a client connected to a digital contents server and a roaming server through a network, comprising the steps of:

requesting said digital contents server to transmit a desired digital content which is protected by a first intellectual property right protection system, wherein the digital content includes information uniquely specifying the first intellectual property right protection system protecting the digital content;

transmitting, in a case where the client cannot process the first intellectual property right protection system, information on a second intellectual property right protection system available for said client, to said digital contents server; and receiving the desired digital content protected by said second intellectual property right protection system, from said roaming server, wherein said receiving step of the desired digital content is arranged so that said roaming server receives, from said digital contents server, the desired digital content protected by the first intellectual property right protection system and the information on said second intellectual property right protection system, and changes the first intellectual property right protection system of the digital content to said second intellectual property right protection system available for said client on the basis of the received information, thereby providing the desired digital content protected by said second intellectual property right protection system available for said client, wherein, in the changed intellectual property right protection system, the information uniquely specifying the first intellectual property right protection system protecting the digital content is also changed to information uniquely specifying the second intellectual property right protection system, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

33. A data distribution method for a digital contents server connected to a client and a roaming server through a network, comprising the steps of:

receiving a transmission request of a desired digital content, which is protected by a first intellectual property right protection system, from said client, wherein the digital content includes information uniquely specifying the first intellectual property right protection system protecting the digital content;

receiving, in a case where the client cannot process the first intellectual property right protection system, information on a second intellectual property right protection system available for said client;

transmitting the desired digital content and the information on said second intellectual property right protection system to the roaming server so that the roaming server can change the first intellectual property right protection system to the second intellectual property right protection system based on the information on said second intellectual property right protection system, and can transmit the desired digital content protected by said second intellectual property right protection system to said client, wherein, in the changed intellectual property right system, the information uniquely specifying the first intellectual property right protection system protecting the digital content is also changed to information uniquely specifying the second intellectual property right protection system, wherein the first and second intellectual property right protection systems each comprise an IPMP System, and wherein IPMPS Type in IPMP Descriptor IPMP Message prescribed in ISO/IEC SC29 14496-1 IS:1998 is used to identify the IPMP system.

* * * * *

UNITED STATES PATENT AND TRADEMARK OFFICE
CERTIFICATE OF CORRECTION

PATENT NO. : 7,177,841 B2
APPLICATION NO. : 09/761719
DATED : February 13, 2007
INVENTOR(S) : Inoue et al.

It is certified that error appears in the above-identified patent and that said Letters Patent is hereby corrected as shown below:

Item (56) References Cited
""Opima Specification Version 1.0" Opima" should read --"OPIMA Specification Version 1.0" OPIMA--.

Sheet 21, Fig. 21, "MODERN" should read --MODEM--.

Col. 3, line 20, Subscripted paragraph beginning "In Table 1," should be deleted.
line 28, "expresses" should read --expressed--.
line 37, "expresses" should read --expressed--.
Col. 4, line 31, "in" should be deleted.
Col. 6, line 31, "FlexDenux" should read --FlexDemux--.
Col. 8, line 15, "IPMS_Type" should read --IPMPS_Type--.
line 29, "case." should read --cases--.
Col. 13, line 12, "deliver" should read --delivers--.
Col. 14, line 30, "like(step" should read --like (step--.
Col. 15, line 22, "roaming" should read --roaming service--.
Col. 16, line 61, "$URL_3$." should read --$URL_3$,--.
Col. 18, line 54, ""Values." should read --Values".--.
Col. 18, line 65, "system" should read --system is--.
Col. 19, line 35, Paragraph beginning "In Expression 2,", entire paragraph should be in full size type.
line 63, Paragraph beginning "In Expression 3," entire paragraph should be in full size type.
Col. 20, line 1, Insert --Expression 4 represents an example of description of "IPMP_Descriptor".-- before "Expression 4: IPMP_Descriptor--.
Col. 20, line 15, "int( lengthofURLbits)" should read --int(lengthof URLbits)--.
line 20, Paragraph beginning in "In Expression 4,", entire paragraph should be in full size type.
line 41, "upstream" should read --upStream--.
Col. 21, line 50, "terminals" should read --terminal--; and
"make" should read --makes--.
Col. 22, line 1, "requiring" should read --requires--.
Col. 23, line 61, "and" should read --and is--.
Col. 24, line 34, "IPMPS Type" should read --IPMPS_Type--; and
"IPMP Descriptor" should read --IPMP_Descriptor--.
Col. 25, line 16, "IPMPS Type" should read --IPMPS_Type--: and
"IPMP Descriptor" should read --IPMP_Descriptor--.

UNITED STATES PATENT AND TRADEMARK OFFICE
CERTIFICATE OF CORRECTION

PATENT NO. : 7,177,841 B2
APPLICATION NO. : 09/761719
DATED : February 13, 2007
INVENTOR(S) : Inoue et al.

It is certified that error appears in the above-identified patent and that said Letters Patent is hereby corrected as shown below:

Col. 25, line 61, "IPMPS Type" should read --IPMPS_Type--; and
"IPMP Descriptor" should read --IPMP_Descriptor--.
Col. 26, line 5, "IPMPS Type" should read --IPMPS_Type--.
line 41, "IPMPS Type" should read --IPMPS_Type--; and
"IPMP Descriptor" should read --IPMP_Descriptor--.
Col. 27, line 23, "IPMPS Type" should read --IPMPS_Type; and
"IPMP Descriptor" should read --IPMP_Descriptor--.
line 58, "IPMPS Type" should read --IPMPS_Type--; and
"IPMP Descriptor" should read --IPMP_Descriptor--.
Col. 28, line 25, "IPMPS Type" should read --IPMPS_Type--; and
"IPMP Descriptor" should read --IPMP_Descriptor--.
Col. 28, line 58, "IPMPS Type" should read --IPMPS_Type--; and
"IPMP Descriptor" should read --IPMP_Descriptor--.
Col. 29, line 23 "IPMPS Type" should read --IPMPS_Type-- and
"IPMP Descriptor" should read --IPMP_Descriptor--.
Col. 30, line 13, "IPMPS type" should read --IPMPS_Type--; and
"IPMP Descriptor" should read --IPMP_Descriptor--.
line 46, "IPMPS Type" should read --IPMPS_Type--; and
"IPMP Descriptor" should read --IPMP_Descriptor--.

Signed and Sealed this

Twenty-fifth Day of December, 2007

JON W. DUDAS
*Director of the United States Patent and Trademark Office*